US012147458B1

(12) United States Patent
Hooton

(10) Patent No.: US 12,147,458 B1
(45) Date of Patent: Nov. 19, 2024

(54) METHOD AND SYSTEM FOR INTEGRATING AND PROCESSING GEOSPATIAL AND LOCATIONAL DATA FROM DIFFERENT TAXONOMIES

(71) Applicant: Christopher Alex Hooton, Washington, DC (US)

(72) Inventor: Christopher Alex Hooton, Washington, DC (US)

( * ) Notice: Subject to any disclaimer, the term of this patent is extended or adjusted under 35 U.S.C. 154(b) by 0 days.

(21) Appl. No.: 18/480,383

(22) Filed: Oct. 3, 2023

Related U.S. Application Data

(60) Provisional application No. 63/514,122, filed on Jul. 18, 2023.

(51) Int. Cl.
*G06F 16/00* (2019.01)
*G06F 16/248* (2019.01)
*G06F 16/29* (2019.01)

(52) U.S. Cl.
CPC ............ *G06F 16/29* (2019.01); *G06F 16/248* (2019.01)

(58) Field of Classification Search
CPC ......... G06F 16/29; G06F 16/248; G06F 16/24
See application file for complete search history.

(56) References Cited

U.S. PATENT DOCUMENTS

| | | | |
|---|---|---|---|
| 7,107,286 B2 | 9/2006 | Burnett | |
| 11,200,280 B2 | 12/2021 | Rohlf et al. | |
| 2010/0185672 A1* | 7/2010 | Rising, III | G06F 16/54 707/E17.014 |
| 2011/0191425 A1* | 8/2011 | Brodeur | G06F 16/9537 709/206 |
| 2015/0006517 A1 | 1/2015 | McDougall et al. | |
| 2015/0049944 A1* | 2/2015 | Bamba | G06F 16/29 382/171 |
| 2015/0312323 A1* | 10/2015 | Peterson | H04L 67/10 709/203 |
| 2018/0046655 A1* | 2/2018 | Ward | G06F 16/2455 |
| 2020/0213426 A1 | 7/2020 | Sennersten et al. | |
| 2020/0278888 A1* | 9/2020 | Connor | G06F 9/5077 |

\* cited by examiner

*Primary Examiner* — Dinku W Gebresenbet
(74) *Attorney, Agent, or Firm* — Muncy, Geissler, Olds & Lowe, P.C.

(57) ABSTRACT

In an aspect, a data processing system stores an integrated hierarchical and spatial database comprising all geospatial units of each geographical entity stored within a plurality of datasets from one or more data publishers and stores integrated hierarchical and spatial relationship information for each geospatial unit with respect to other geospatial units, receives a query to the integrated hierarchical and spatial database, wherein the query specifies a geographic place, a geospatial unit, a time period, a search topic, or any combination thereof, to be applied across the one or more data publishers, the plurality of datasets, and a plurality of hierarchies of the plurality of datasets, and transmits a response to the query, wherein the response includes one or more search results linked together across the one or more data publishers, the plurality of datasets, the plurality of hierarchies, or any combination thereof.

20 Claims, 47 Drawing Sheets

| Code | Name | Type | Geometry |
|---|---|---|---|
| USA | United States of America | Country | x,y geospatial features |
| III | Region III: South | Region | x,y geospatial features |
| IV | Region IV: West | Region | x,y geospatial features |
| 5 | Division 5: South Atlantic | Division | x,y geospatial features |
| 11 | District of Columbia | Federal District | x,y geospatial features |
| 001 | District of Columbia, District of Columbia | County | x,y geospatial features |
| 11001000101... | 11001000101 | Census Tract | x,y geospatial features |
| Census Tract n | Census Tract n | Census Tract | x,y geospatial features |
| 110010001011... | 110010001011 | Census Block Group | x,y geospatial features |
| Census Block Group n | Census Block Group n | Census Block Group | x,y geospatial features |
| 110010001011000... | 110010001011000 | Census Block | x,y geospatial features |
| Census Block n | Census Block n | Census Block | x,y geospatial features |
| 20001... | 20001 | Zip Code | x,y geospatial features |
| Zip Code n | Zip Code n | Zip Code | x,y geospatial features |
| 00030 | District of Columbia Public Schools | School District | x,y geospatial features |
| 98 | Delegate District (At Large) | Congressional District | x,y geospatial features |
| 50000 | Washington City | County Subdivision | x,y geospatial features |
| 02-001... | Precinct 1 | Voting District | x,y geospatial features |
| Voting District n | Voting District n | Voting District | x,y geospatial features |

*FIG. 5A*

| Code | Name | Type | Geometry |
|---|---|---|---|
| 1... | 1 | Traffic Analysis Zone | x,y geospatial features |
| Traffic Analysis Zone n | Traffic Analysis Zone n | Traffic Analysis Zone | x,y geospatial features |
| 50000 | Washington City | Place | x,y geospatial features |
| 92242 | Washington–Arlington, DC-VA-MD | Urban Area | x,y geospatial features |
| 47900 | Washington-Arlington-Alexandria, DC-VA-MD-WV | Core Based Statistical Area | x,y geospatial features |
| 548 | Washington-Baltimore-Arlington, DC-MD-VA-WV-PA | Core Statistical Area | x,y geospatial features |
| 47894 | Washington-Arlington-Alexandria, DC-VA-MD-WV | Metropolitan Division | x,y geospatial features |
| 00101... | District of Columbia (West) PUMA | Public Use Microdata Area | x,y geospatial features |
| Public Use Microdata Area n | District of Columbia PUMA n | Public Use Microdata Area | x,y geospatial features |
| 1... | Ward 1 | Ward | x,y geospatial features |
| Ward n | Ward n | Ward | x,y geospatial features |
| 1A | ANC 1A | Advisory Neighborhood Commission | x,y geospatial features |
| Advisory Neighborhood Commission n | ANC n | Advisory Neighborhood Commission | x,y geospatial features |
| 1C08... | SMD 1C08 | Single Member District | x,y geospatial features |
| Single Member District n | SMD n | Single Member District | x,y geospatial features |
| SchEDisPly_1... | 1 | School Election District | x,y geospatial features |
| School Election District n | School Election District n | School Election District | x,y geospatial features |

FIG. 5B

| Code | Name | Type | Geometry |
|---|---|---|---|
| -200001... | Cardozo | School Attendance Zone | x,y geospatial features |
| School Attendance Zone n | MacAurthur | School Attendance Zone | x,y geospatial features |
| NE... | Northeast | Quadrant | x,y geospatial features |
| Quadrant n | Quadrant n | Quadrant | x,y geospatial features |
| ... | ... | ... | ... |
| Code n | Name n | Type n | x,y geospatial features |

*FIG. 5C*

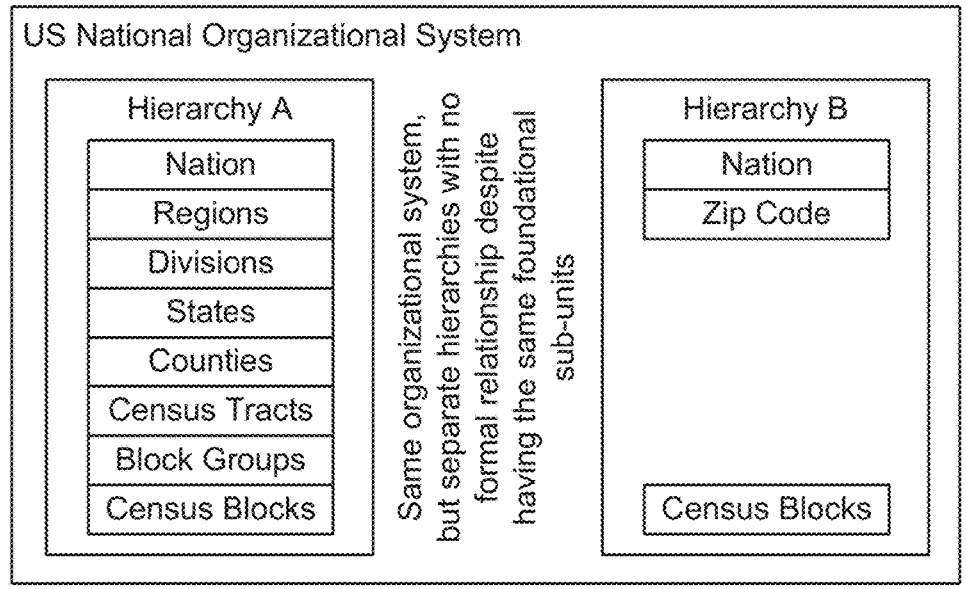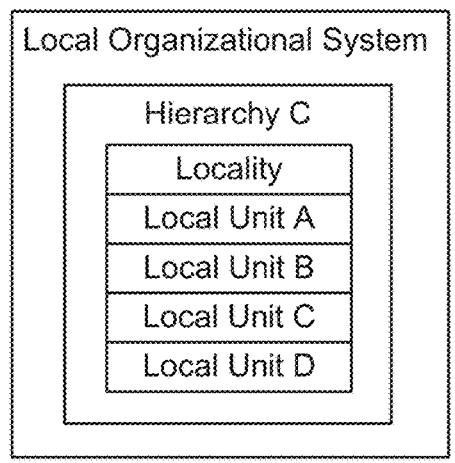
FIG. 8

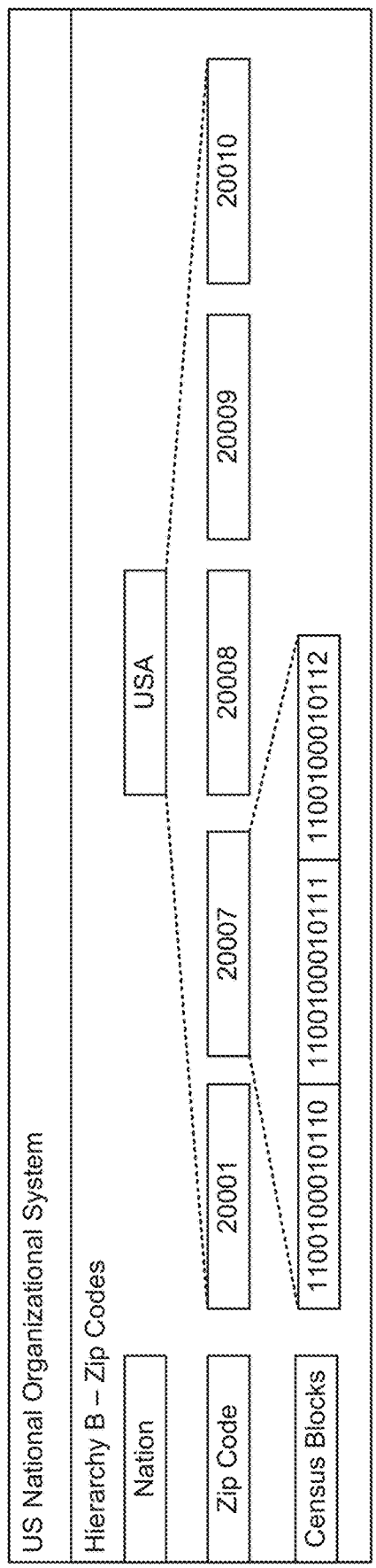
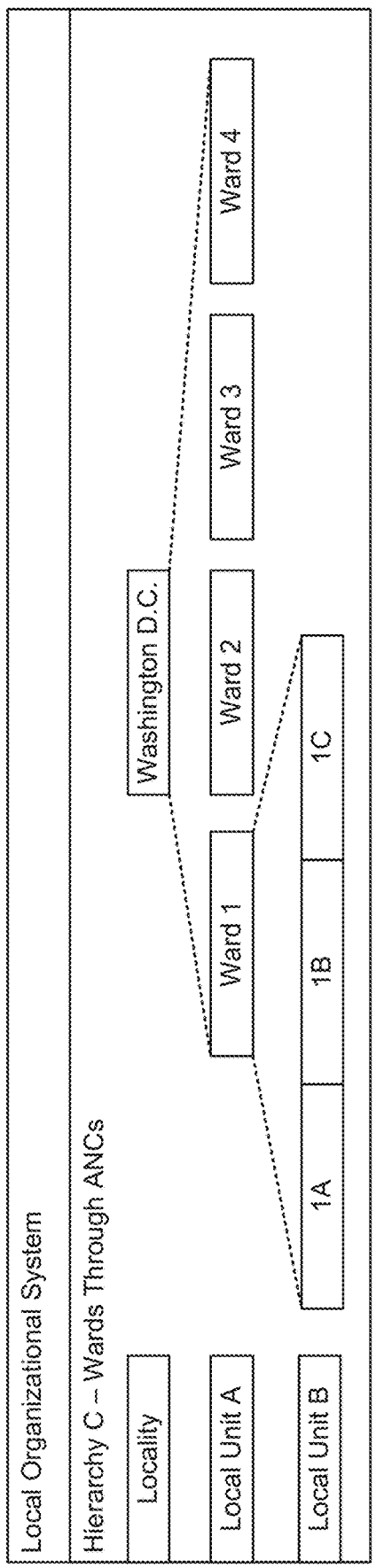
FIG. 9B

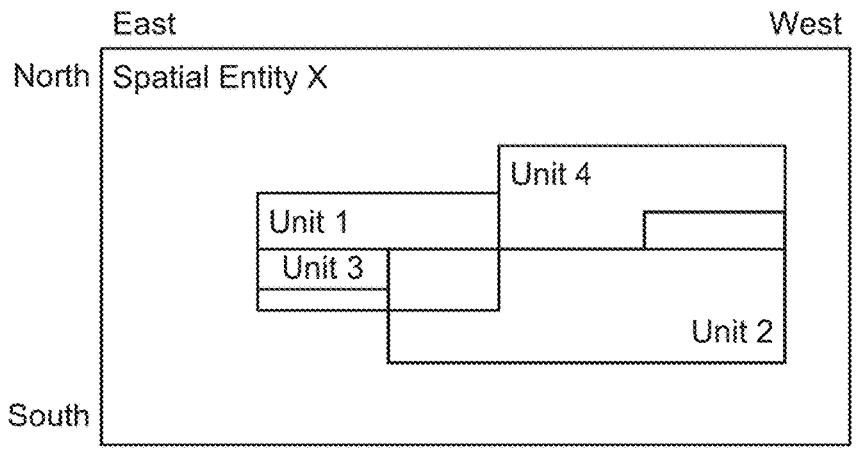

Hierarchical Relationships

|        | Unit 1      | Unit 2      | Unit 3      | Unit 4      |
|--------|-------------|-------------|-------------|-------------|
| Unit 1 | Hierarchy A |             | Hierarchy A |             |
| Unit 2 |             | Hierarchy B |             |             |
| Unit 3 | Hierarchy A |             | Hierarchy A |             |
| Unit 4 |             |             |             | Hierarchy C |

Spatial Relationships

|        | Unit 1 | Unit 2 | Unit 3 | Unit 4 |
|--------|--------|--------|--------|--------|
| Unit 1 | Same | Partial Spatial Overlap | Complete Spatial Overlap | No Spatial Overlap |
| Unit 2 | Partial Spatial Overlap | Same | No Spatial Overlap | Partial Spatial Overlap |
| Unit 3 | Complete Spatial Overlap | No Spatial Overlap | Same | No Spatial Overlap |
| Unit 4 | Partial Spatial Overlap | Partial Spatial Overlap | No Spatial Overlap | Same |

*FIG. 12*

|  | Country | Region 1 | Region 2 | Division 1 | Division 2 | State 1 | State 2 | County 1 | County 2 |
|---|---|---|---|---|---|---|---|---|---|
| Country | 1 | | | | | | | | |
| Region 1 | 1 | 1 | | | | | | | |
| Region 2 | 1 | | 1 | | | | | | |
| Division 1 | 1 | | 1 | 1 | | | | | |
| Division 2 | 1 | | 1 | | 1 | | | | |
| State 1 | 1 | | 1 | | 1 | 1 | | | |
| State 2 | 1 | | 1 | | 1 | | 1 | | |
| County 1 | 1 | | 1 | | 1 | | 1 | 1 | |
| County 2 | 1 | | 1 | | 1 | | 1 | | 1 |
| Census Tract 1 | 1 | | 1 | | 1 | | 1 | | 1 |
| Census Tract 2 | 1 | | | | 1 | | 1 | | 1 |
| Block Group 1 | 1 | | 1 | | 1 | | 1 | | 1 |
| Block Group 2 | 1 | | | | 1 | | 1 | | 1 |
| Census Block 1 | 1 | | 1 | | 1 | | 1 | | 1 |
| Census Block 2 | 1 | | | | 1 | | 1 | | 1 |
| Zip 1 | 1 | | | | | | | | |
| Zip 2 | 1 | | | | | | | | |
| Local 1 | | | | | | | | | |
| Local 2 | | | | | | | | | |

*FIG. 14A*

| | Census Tract 1 | Census Tract 2 | Block Group 1 | Block Group 2 | Census Block 1 | Census Block 2 | Zip 1 | Zip 2 | Local 1 | Local 2 |
|---|---|---|---|---|---|---|---|---|---|---|
| Country | 1 | 1 | 1 | 1 | 1 | 1 | 1 | 1 | | |
| Region 1 | 1 | 1 | 1 | 1 | 1 | 1 | | | | |
| Region 2 | 1 | 1 | 1 | 1 | 1 | 1 | | | | |
| Division 1 | 1 | 1 | 1 | 1 | 1 | 1 | | | | |
| Division 2 | 1 | 1 | 1 | 1 | 1 | 1 | | | | |
| State 1 | 1 | 1 | 1 | 1 | 1 | 1 | | | | |
| State 2 | 1 | | | | | | | | | |
| County 1 | | 1 | 1 | 1 | 1 | 1 | | | | |
| County 2 | | 1 | 1 | 1 | 1 | | | | | |
| Census Tract 1 | 1 | | | | | | | | | |
| Census Tract 2 | | 1 | 1 | 1 | 1 | 1 | | | | |
| Block Group 1 | | | 1 | | 1 | | | | | |
| Block Group 2 | | | | 1 | 1 | 1 | | | | |
| Census Block 1 | | | | | 1 | | | | | |
| Census Block 2 | | | | | | 1 | | 1 | | |
| Zip 1 | | | | | | | 1 | | | |
| Zip 2 | | | | | | 1 | | 1 | | |
| Local 1 | | | | | | | | | 1 | |
| Local 2 | | | | | | | | | | 1 |

*FIG. 14B*

| | Country | Region 1 | Region 2 | Division 1 | Division 2 | State 1 | State 2 | County 1 | County 2 |
|---|---|---|---|---|---|---|---|---|---|
| Country | 1 | 1 | 1 | 1 | 1 | 1 | 1 | 1 | 1 |
| Region 1 | 1 | 1 | Hierarchical. No spatial overlap. | | | | | | |
| Region 2 | 1 | | 1 | | | | | | |
| Division 1 | 1 | 1 | | 1 | Hierarchical. No spatial overlap. | | | | |
| Division 2 | 1 | | 1 | | 1 | | | | |
| State 1 | 1 | 1 | | 1 | | 1 | Hierarchical. No spatial overlap. | | |
| State 2 | 1 | | 1 | | 1 | | 1 | | |
| County 1 | 1 | 1 | | 1 | | 1 | | 1 | Hierarchical. No spatial overlap. |
| County 2 | 1 | | 1 | | 1 | | 1 | | 1 |
| Census Tract 1 | 1 | 1 | | 1 | | 1 | | 1 | |
| Census Tract 2 | 1 | | 1 | | 1 | | 1 | | 1 |
| Block Group 1 | 1 | 1 | | 1 | | 1 | | 1 | |
| Block Group 2 | 1 | | 1 | | 1 | | 1 | | 1 |
| Census Block 1 | 1 | 1 | | 1 | | 1 | | 1 | |
| Census Block 2 | 1 | | 1 | | 1 | | 1 | | 1 |
| Zip 1 | 1 | Not hierarchically related | Not hierarchically related | Not hierarchically related | Not hierarchically related | Not hierarchically related | Not hierarchically related | Not hierarchically related | Not hierarchically related |
| Zip 2 | 1 | | | | | | | | |
| Local 1 | Not hier'ly related | | | | | | | | |
| Local 2 | | | | | | | | | |

| | Census Tract 1 | Census Tract 2 | Block Group 1 | Block Group 2 | Census Block 1 | Census Block 2 | Zip 1 | Zip 2 | Local 1 | Local 2 |
|---|---|---|---|---|---|---|---|---|---|---|
| Country | 1 | 1 | 1 | 1 | 1 | 1 | 1 | 1 | Not hier'ly related | Not hier'ly related |
| Region 1 | Hierarchical. No spatial overlap. | 1 | 1 | 1 | 1 | 1 | Not hierarchically related | 1 | Not hierarchically related | 1 |
| Region 2 | Hierarchical. No spatial overlap. | 1 | 1 | 1 | 1 | 1 | Not hierarchically related | 1 | Not hierarchically related | 1 |
| Division 1 | Hierarchical. No spatial overlap. | 1 | 1 | 1 | 1 | 1 | Not hierarchically related | 1 | Not hierarchically related | 1 |
| Division 2 | Hierarchical. No spatial overlap. | 1 | 1 | 1 | 1 | 1 | Not hierarchically related | 1 | Not hierarchically related | 1 |
| State 1 | Hierarchical. No spatial overlap. | 1 | 1 | 1 | 1 | 1 | Not hierarchically related | 1 | Not hierarchically related | 1 |
| State 2 | Hierarchical. No spatial overlap. | 1 | 1 | 1 | 1 | 1 | Not hierarchically related | 1 | Not hierarchically related | 1 |
| County 1 | Hierarchical. No spatial overlap. | 1 | 1 | 1 | 1 | 1 | Not hierarchically related | 1 | Not hierarchically related | 1 |
| County 2 | Hierarchical. No spatial overlap. | 1 | 1 | 1 | 1 | 1 | Not hierarchically related | 1 | Not hierarchically related | 1 |
| Census Tract 1 | 1 | | Hierarchical. No spatial overlap. | 1 | 1 | 1 | Not hierarchically related | 1 | Not hierarchically related | 1 |
| Census Tract 2 | | 1 | Hierarchical. No spatial overlap. | 1 | 1 | 1 | Not hierarchically related | 1 | Not hierarchically related | 1 |
| Block Group 1 | Hierarchical. No spatial overlap. | 1 | 1 | | Hierarchical. No spatial overlap. | 1 | Not hierarchically related | 1 | Not hierarchically related | 1 |
| Block Group 2 | Hierarchical. No spatial overlap. | 1 | | 1 | Hierarchical. No spatial overlap. | 1 | Not hierarchically related | 1 | Not hierarchically related | 1 |
| Census Block 1 | Not hierarchically related | 1 | Not hierarchically related | 1 | 1 | | Hierarchical. No spatial overlap. | H. NSO. | Not hierarchically related | 1 |
| Census Block 2 | Not hierarchically related | 1 | Not hierarchically related | 1 | | 1 | H. NSO. | H. NSO. | Not hierarchically related | 1 |
| Zip 1 | Not hierarchically related | 1 | Not hierarchically related | 1 | Not hier. related | H. NSO. | 1 | | Not hier'ly related | 1 |
| Zip 2 | | | | | | | | 1 | Not hier'ly related | H. NSO. |
| Local 1 | | | | | | | | | 1 | |
| Local 2 | | | | | | | | | H. NSO. | 1 |

|  | Country | Region 1 | Region 2 | Division 1 | Division 2 | State 1 | State 2 | County 1 | County 2 |
|---|---|---|---|---|---|---|---|---|---|
| Country | 1 | 1 | 1 | 1 | 1 | 1 | 1 | 1 | 1 |
| Region 1 | 1 | 1 | *Hierarchical. No spatial overlap.* | | | | | | |
| Region 2 | 1 | | 1 | 1 | 1 | 1 | 1 | 1 | 1 |
| Division 1 | 1 | 1 | 1 | 1 | *Hierarchical. No spatial overlap.* | | | | |
| Division 2 | 1 | | 1 | | 1 | 1 | 1 | 1 | 1 |
| State 1 | 1 | 1 | 1 | 1 | 1 | 1 | *Hierarchical. No spatial overlap.* | | |
| State 2 | 1 | | 1 | | 1 | | 1 | 1 | 1 |
| County 1 | 1 | 1 | 1 | 1 | 1 | 1 | 1 | 1 | *Hierarchical. No spatial overlap.* |
| County 2 | 1 | | 1 | | 1 | | 1 | | 1 |
| Census Tract 1 | 1 | | 1 | | 1 | | 1 | | 1 |
| Census Tract 2 | 1 | | 1 | | 1 | | 1 | | 1 |
| Block Group 1 | 1 | | 1 | | 1 | | 1 | | 1 |
| Block Group 2 | 1 | | 1 | | 1 | | 1 | | 1 |
| Census Block 1 | 1 | | 1 | | 1 | | 1 | | 1 |
| Census Block 2 | 1 | | 1 | | 1 | | 1 | | 1 |
| Zip 1 | 1 | | | | | | | | |
| Zip 2 | 1 | | | | | | | | |
| Local 1 | | | | | | | | | |
| Local 2 | | | | | | | | | |

*FIG. 16A*

|  | Census Tract 1 | Census Tract 2 | Block Group 1 | Block Group 2 | Census Block 1 | Census Block 2 | Zip 1 | Zip 2 | Local 1 | Local 2 |
|---|---|---|---|---|---|---|---|---|---|---|
| Country |  |  |  |  |  |  |  |  |  |  |
| Region 1 | 1 | 1 | Hierarchical. No spatial overlap. | | | | | | | |
| Region 2 |  |  |  |  |  |  |  |  |  |  |
| Division 1 | 1 | 1 | Hierarchical. No spatial overlap. | | | | | | | |
| Division 2 |  |  |  |  |  |  |  |  |  |  |
| State 1 | 1 | 1 | Hierarchical. No spatial overlap. | | | | | | | |
| State 2 |  |  |  |  |  |  |  |  |  |  |
| County 1 | 1 | 1 | Hierarchical. No spatial overlap. | | | | | | | |
| County 2 |  |  |  |  |  |  |  |  |  |  |
| Census Tract 1 | 1 |  | Hierarchical. No spatial overlap. | | | | | | | |
| Census Tract 2 |  | 1 | 1 | 1 | 1 | 1 |  |  |  |  |
| Block Group 1 | Hierarchical. No spatial overlap. | | 1 |  | 1 | 1 |  |  |  |  |
| Block Group 2 | | | | 1 | 1 | 1 | Hierarchical. No spatial overlap. | | | |
| Census Block 1 | | | Hierarchical. No spatial overlap. | | 1 |  | 1 | 1 | H. NSO. | |
| Census Block 2 | | | | | | 1 | H. NSO. | 1 | | H. NSO. |
| Zip 1 | | | | | H. NSO. | H. NSO. | 1 |  |  |  |
| Zip 2 | | | | | | | | 1 |  |  |
| Local 1 | | | | | | | | | 1 |  |
| Local 2 | | | | | | | | | H. NSO. | 1 |

FIG. 16B

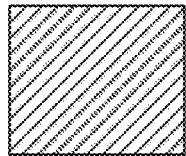 Same organizational system, but non-hierarchical. No informal spatial overlap.
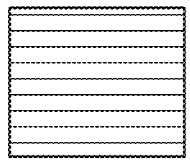 Same organizational system, but non-hierarchical. Informal spatial overlap.
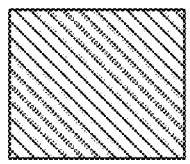 Different organizational system and hierarchy. Informal spatial overlap.
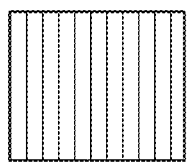 Different organizational system and hierarchy. No informal spatial overlap.
*FIG. 16C*

| | Country | Region 1 | Region 2 | Division 1 | Division 2 | State 1 | State 2 | County 1 | County 2 |
|---|---|---|---|---|---|---|---|---|---|
| Country | 1 | Integration possible through existing hierarchical relationship matrix | | | | | | | |
| Region 1 | | 1 | No integration possible for spatial-based query | | | | | | |
| Region 2 | | | 1 | Integration possible through existing hierarchical relationship matrix | | | | | |
| Division 1 | | | | 1 | No integration possible for spatial-based query | | | | |
| Division 2 | | | | | 1 | Integration possible through existing... | | | |
| State 1 | | | | | | 1 | No integration possible for... | | |
| State 2 | | | | | | | 1 | Integration possible... | No integ... |
| County 1 | Integration possible through existing hierarchical relationship matrix | No integration possible for spatial-based query | Integration possible through existing hierarchical relationship matrix | No integration possible for spatial-based query | Integration possible through existing hierarchical relationship matrix | No integration possible for spatial-based query | Integration possible through existing hierarchical relationship matrix | 1 | |
| County 2 | | | | | | | | No integration possible for spatial-based query | Integration possible through existing hierarchical relationship matrix |
| Census Tract 1 | | | | | | | | | |
| Census Tract 2 | | | | | | | | | |
| Block Group 1 | | | | | | | | | |
| Block Group 2 | | | | | | | | | |
| Census Block 1 | | | | | | | | | |
| Census Block 2 | | | | | | | | | |
| Zip 1 | | | | | | | | | |
| Zip 2 | | | | | | | | | |
| Local 1 | | | | | | | | | |
| Local 2 | | | | | | | | | |

FIG. 17A

| | Census Tract 1 | Census Tract 2 | Block Group 1 | Block Group 2 | Census Block 1 | Census Block 2 | Zip 1 | Zip 2 | Local 1 | Local 2 |
|---|---|---|---|---|---|---|---|---|---|---|
| Country | Integration possible through existing hierarchical relationship matrix | | | | | | | | | |
| Region 1 | No integration possible through existing hierarchical relationship matrix | | | | | | | | | |
| Region 2 | Integration possible through existing hierarchical relationship matrix | | | | | | | | | |
| Division 1 | No integration possible through existing hierarchical relationship matrix | | | | | | | | | |
| Division 2 | Integration possible through existing hierarchical relationship matrix | | | | | | | | | |
| State 1 | No integration possible through existing hierarchical relationship matrix | | | | | | | | | |
| State 2 | Integration possible through existing hierarchical relationship matrix | | | | | | | | | |
| County 1 | No integration possible through existing hierarchical relationship matrix | | | | | | | | | |
| County 2 | Integration possible through existing hierarchical relationship matrix | | | | | | | | | |
| Census Tract 1 | 1 | No integration possible for spatial-based query | | | | | | | | |
| Census Tract 2 | No integration possible for spatial-based query | 1 | Integration possible through existing hierarchical relationship matrix | | | | | | | |
| Block Group 1 | | Integration possible through existing hierarchical relationship... | 1 | No integration possible for spatial-based query | | | | | | |
| Block Group 2 | | No integration possible for spatial-based query | Integration possible through existing hierarchical relationship matrix | 1 | Integration possible through existing hierarchical relationship... | | | | | |
| Census Block 1 | | | | No integration possible for spatial-based query | 1 | Integration possible through existing... | No integration possible for spatial-based query | | | |
| Census Block 2 | | | | Integration possible through existing... | No integration possible for spatial-based query | 1 | No integ... | No integ... | | |
| Zip 1 | | | | | Hierarch-ical. No spatial overlap. | No integ... | 1 | Integ-ration... | | |
| Zip 2 | | | | | Integrat... | Integrat... | No int... | 1 | No int... | No int... |
| Local 1 | | | | | | | | | 1 | No int... |
| Local 2 | | | | | | | | | No int... | 1 |

FIG. 17B

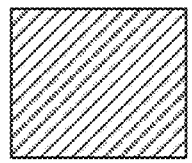 No integration possible for spatial-based query
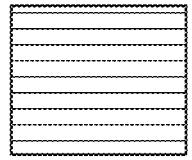 Integration possible through spatial join and weighting
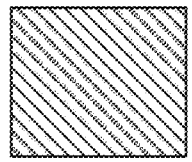 Integration possible through spatial join and weighting
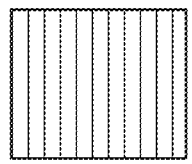 No integration possible for spatial-based query
*FIG. 17C*

|  | Country | Region 1 | Region 2 | Division 1 | Division 2 | State 1 | State 2 | County 1 | County 2 |
|---|---|---|---|---|---|---|---|---|---|
| Country | 1 | 1 | 1 | 1 | 1 | 1 | 1 | 1 | 1 |
| Region 1 | 1 | 1 |  |  |  |  |  |  |  |
| Region 2 | 1 |  | 1 | 1 | 1 |  | 1 |  | 1 |
| Division 1 | 1 |  | 1 | 1 |  | 1 |  |  |  |
| Division 2 | 1 |  | 1 |  | 1 | 1 | 1 |  |  |
| State 1 | 1 |  | 1 | 1 | 1 | 1 |  |  |  |
| State 2 | 1 |  | 1 |  | 1 |  | 1 | 1 | 1 |
| County 1 | 1 |  | 1 |  |  |  | 1 | 1 |  |
| County 2 | 1 |  | 1 |  |  |  | 1 |  | 1 |
| Census Tract 1 | 1 |  | 1 |  | 1 |  | 1 |  | 1 |
| Census Tract 2 | 1 |  | 1 |  |  |  | 1 |  | 1 |
| Block Group 1 | 1 |  | 1 |  |  |  | 1 |  | 1 |
| Block Group 2 | 1 |  | 1 |  |  |  | 1 |  | 1 |
| Census Block 1 | 1 |  | 1 |  |  |  | 1 |  | 1 |
| Census Block 2 | 1 |  | 1 |  | 1 |  | 1 |  | 1 |
| Zip 1 | 1 |  | 2 |  | 2 |  | 2 |  | 2 |
| Zip 2 | 1 |  | 2 |  | 2 |  | 2 |  | 2 |
| Local 1 | 3 |  | 3 |  | 3 |  | 3 |  | 3 |
| Local 2 | 3 |  | 3 |  | 3 |  | 3 |  | 3 |

1 = hierarchical spatial overlap; 2 = same hierarchical system with informal spatial overlap; 3 = different hierarchical system with informal overlap

| | Census Tract 1 | Census Tract 2 | Block Group 1 | Block Group 2 | Census Block 1 | Census Block 2 | Zip 1 | Zip 2 | Local 1 | Local 2 |
|---|---|---|---|---|---|---|---|---|---|---|
| Country | 1 | 1 | 1 | 1 | 1 | 1 | 1 | 1 | 3 | 3 |
| Region 1 | 1 | 1 | 1 | 1 | 1 | 1 | 2 | 2 | 3 | 3 |
| Region 2 | 1 | 1 | 1 | 1 | 1 | 1 | 2 | 2 | 3 | 3 |
| Division 1 | 1 | 1 | 1 | 1 | 1 | 1 | 2 | 2 | 3 | 3 |
| Division 2 | 1 | 1 | 1 | 1 | 1 | 1 | 2 | 2 | 3 | 3 |
| State 1 | 1 | 1 | 1 | 1 | 1 | 1 | 2 | 2 | 3 | 3 |
| State 2 | 1 | 1 | | 1 | | | | | | |
| County 1 | 1 | 1 | 1 | 1 | 1 | 1 | 2 | 2 | 3 | 3 |
| County 2 | 1 | 1 | | 1 | 1 | | | | | |
| Census Tract 1 | 1 | | 1 | | | | | | | |
| Census Tract 2 | | 1 | | 1 | | 1 | 2 | 2 | 3 | 3 |
| Block Group 1 | | 1 | | 1 | | | | | | |
| Block Group 2 | | 1 | | 1 | | 1 | 2 | 2 | 3 | 3 |
| Census Block 1 | | | | | | 1 | | 1 | | |
| Census Block 2 | | 1 | | 1 | 1 | 3 | 2 | 1 | 3 | 3 |
| Zip 1 | | 2 | 2 | 2 | | | 1 | | 3 | 3 |
| Zip 2 | | 2 | 2 | 2 | | | | 1 | 3 | 3 |
| Local 1 | | 3 | 3 | 3 | | | | | 1 | 1 |
| Local 2 | | 3 | 3 | 3 | | | | | 1 | 1 |

Geospatial unit-based repository of geo-tagged items

| Code | Name | Type | Geometry | Traffic Volume | Retailer 1 Inventory | Retailer 2 Inventory | Supplier 1 Inventory | Supplier 2 Inventory |
|---|---|---|---|---|---|---|---|---|
| Unit 1 | Name 1 | Type 1 | Geometry 1 | 4 | 8 | 0 | 3 | 3 |
| Unit 2 | Name 2 | Type 2 | Geometry 2 | 10 | 8 | 6 | 0 | 6 |
| Unit 3 | Name 3 | Type 3 | Geometry 3 | 1 | 0 | 0 | 0 | 0 |
| Unit 4 | Name 4 | Type 4 | Geometry 4 | 5 | 0 | 0 | 0 | 0 |
| Unit n | Name n | Type n | Geometry n | n | n | n | n | n |
| Entity x | Name x | Type x | Geometry x | 30 | 8 | 12 | 3 | 9 |

FIG. 19B

| Search Parameters | Filtering Parameters | | | |
|---|---|---|---|---|
| | Length | Time | Height | Breadth |
| Place | Filter by number of observations required (N observations) | | | |
| Period | | Filter by what point in time the observation was recorded | | |
| Topic | | | Filter and/or order by the most/least intense observations | |
| Unit | | | | Include other spatial units that meet the same search and filter criteria |

FIG. 23A

| Search Parameters | Search Results | Filtering Parameters | | | |
|---|---|---|---|---|---|
| | | Length | Time | Height | Breadth |
| Place | List of possible places that match the search | - Min. Obs.<br>- Max. Obs. | | | |
| Period | List of possible times that match the search | | - Earliest Date<br>- Latest Date | | |
| Topic | List of possible topics that match the search | | | - Min. Intensity<br>- Max. Intensity<br>- Order by most / least intense | |
| Unit | List of possible units that match the search | | | | Include additional units:<br>- Zip Code<br>- County<br>- Place... |

FIG. 23B

| Search Parameters | Search Results | Filtering Parameters | | | |
|---|---|---|---|---|---|
| | | Length | Time | Height | Breadth |
| Place | List of possible places that match the search | - Min. Obs.<br>- Max. Obs. | | | |
| Period | List of possible times that match the search | | - Earliest Date<br>- Latest Date | | |
| Topic | List of possible topics that match the search | | | - Min. Intensity<br>- Max. Intensity<br>- Order by most / least intense | |
| Unit | List of possible units that match the search | | | | Include additional units:<br>- Zip Code<br>- County<br>- Place... |

Search and filtering parameters can be input in any order

FIG. 24

Search function example

| | Search Parameters | Search Results | Filtering Parameters | | | |
|---|---|---|---|---|---|---|
| | | | Length | Time | Height | Breadth |
| | *Terms searched | *Search results returned | | | | |
| Place | "District of Columbia" | -District of Columbia (county)<br>-District of Columbia (federal district)<br>-District of Columbia (entity n) | - Min. Obs.<br>- Max. Obs. | | | |
| Period | "2010-2020" | -2010 (year)<br>-2010 (Q1)<br>-2010 (Q2)...<br>-2010 (time period n) | | - Earliest Date<br>- Latest Date | | |
| Topic | "Jobs" | -Employment<br>-Jobs<br>-Payroll<br>-Employment topic n | | | - Min. Intensity<br>- Max. Intensity<br>- Order by most / least intense | |
| Unit | "Wards" | -Advisory Neighborhood Commission (sub-unit)<br>-Single Member District (sub-unit)<br>-Unit n | | | | Include additional units:<br>- Zip Code<br>- County<br>- Place.... |

*FIG. 25A*

Filtering function example

| Search Parameters | Search Results | Filtering Parameters | | | | |
|---|---|---|---|---|---|---|
| | | Length | Time | Height | Breadth | |
| | *Selected search results | - Min. Obs. 5<br>- Max. Obs. 10 | | | | |
| Place | District of Columbia (federal district) | | | | | |
| Period | 2010-2020 | | - Earliest Date<br>- Latest Date: March 31 | | | |
| Topic | Employment | | | - Min. Intensity: 10,000<br>- Max. Intensity: 1,000,000<br>- Order by most / least intense: Yes | | |
| Unit | Ward | | | | Include additional units:<br>- Zip Code: Yes<br>- County<br>- Place... | |

FIG. 25B

Example output table from search and filtering

*Results for Ward and Zip Code units | Min. 5 observations, Max. 10 observations | All observations between 10000-1000000 | All observations recorded before March 31

| Code | Name | Type | Geometry | Period | Employment | Jobs | Time |
|---|---|---|---|---|---|---|---|
| 1 | Ward 1 | Ward | x,y geo features | 2009 | | 175000 | 02-01-2009 |
| 1 | Ward 1 | Ward | x,y geo features | 2010 | | 180000 | 02-01-2010 |
| 1 | Ward 1 | Ward | x,y geo features | 2011 | | 185000 | 02-01-2011 |
| 1 | Ward 1 | Ward | x,y geo features | 2012 | | 190000 | 02-01-2012 |
| 1 | Ward 1 | Ward | x,y geo features | 2013 | | 190000 | 02-01-2013 |
| 2 | Ward 2 | Ward | x,y geo features | 2010 | | 95000 | 02-01-2010 |
| ... | ... | ... | ... | ... | ... | ... | ... |
| 8 | Ward 8 | Ward | x,y geo features | 2009 | | 50000 | 02-01-2009 |
| 8 | Ward 8 | Ward | x,y geo features | 2010 | | 50000 | 02-01-2010 |
| 8 | Ward 8 | Ward | x,y geo features | 2011 | | 50000 | 02-01-2011 |
| 20001 | 20001 | Zip Code | x,y geo features | 2010 | 15000 | | 01-01-2010 |
| 20001 | 20001 | Zip Code | x,y geo features | 2011 | 16000 | | 01-01-2011 |
| 20001 | 20001 | Zip Code | x,y geo features | 2012 | 12000 | | 01-01-2012 |
| ... | ... | ... | ... | ... | ... | ... | ... |
| Zip code n | Name n | Zip Code | x,y geo features | 2010 | 17000 | | 01-01-2010 |

FIG. 26A

METHOD AND SYSTEM FOR INTEGRATING AND PROCESSING GEOSPATIAL AND LOCATIONAL DATA FROM DIFFERENT TAXONOMIES

CROSS-REFERENCE TO RELATED APPLICATIONS

The present Application for Patent claims the benefit of U.S. Provisional Application No. 63/514,122, entitled "METHOD AND SYSTEM FOR INTEGRATING AND PROCESSING GEOSPATIAL AND LOCATIONAL DATA FROM DIFFERENT TAXONOMIES," filed Jul. 18, 2023, assigned to the assignee hereof, and expressly incorporated herein by reference in its entirety.

BACKGROUND OF THE DISCLOSURE

1. Field of the Disclosure

Aspects of the disclosure relate generally to integrating and processing geospatial and locational data from different taxonomies.

2. Description of the Related Art

Current geospatial and locational data processing and analysis systems face two primary hurdles that significantly slow the speed of processing the data and limit the ability to perform comprehensive and sophisticated analyses. First, geospatial data are siloed across publishers of the data, formal relationship hierarchies, and individual datasets. Second, current systems for geospatial data processing and analysis require significant technical expertise to perform any processing or analysis, particularly when it involves multiple taxonomies. These hurdles prevent users from seamlessly transitioning between data from different publishers, hierarchies (including different geographic units), and datasets while performing analysis, and from analyzing data across these taxonomies.

The first issue of data silos creates a significant barrier to processing and analysis by preventing the linkage of geospatial units to their full range of relevant data via the units' full set of formal, hierarchical and informal, spatial relationships, except by individual and manual conversions performed ex post by the user. Generally, each individual geospatial datum—be it a unit datum or an item datum with geotagged/locational information—can be placed within one or several hierarchical systems and within one or several spatial systems.

Across these hierarchical and spatial systems, there are several types of relationships between geospatial units that are possible and which currently must first be manually documented in order to fully analyze a geospatial unit's full set of relevant data. Specifically, there are two types of formal relationships and three types of informal relationships. First, there are formal, hierarchical relationships between units from the same hierarchical track system, in which a unit is a direct component of one or more other units, which is a direct component of one or more other units, and so forth (e.g., Jackson County is a formal hierarchical sub-unit of the state of Missouri). The present application refers to this type of formal relationship as a hierarchical relationship. Second, there are formal, organizational system relationships in which geospatial units do not overlap in space and do not come from the same hierarchical track, but do belong to the same organizational system (e.g., Jackson County is in the same system with the state of Nebraska, but is not a hierarchical component of Nebraska and has no spatial overlap with it). These geospatial units exist in space together and can be informally linked, but not because of hierarchical or spatial relationships. The present application refers to this type of relationship as an organizational system relationship. Third, there are informal, spatial relationships (e.g., a zip code x overlaps in space with a census tract y, but is from a different hierarchy and/or organizational system). The present application refers to this type of relationship as an informal, spatial relationship. Fourth, there is a subtype of informal, spatial relationships in which different hierarchies and or organizational systems use the same geospatial unit in their respective hierarchical system. In this case, there may also be informal, spatial relationships between the units; however, there is an additional consideration because a direct relationship exists between the shared units (since they are the same entities) and an informal hierarchical relationship can be drawn from the other units in each hierarchy to those in the other hierarchies based on approximate aggregation level (e.g., census block x is a formal sub-unit of both zip code y and census tract z; consequently zip code y and census tract z may also have an informal relationship). The present application refers to this type of relationship as a foundational unit relationship. Finally, there are also geospatial units that have no hierarchical relationship, no organizational relationship, and no spatial relationship. These exist in space together, but can only be arbitrarily grouped (e.g., New York City is often compared to London, but they are not formally or informally related).

Each geospatial data observation can be linked to several other geospatial units through these relationships. However, the siloed nature of geospatial data means that a user cannot identify those relationships prima facie or draw analytical conclusions from them without first performing independent queries to each dataset, hierarchy, and publisher (e.g., a zip code dataset from a first publisher and a census tract dataset from a second publisher) and then manually linking the data and analyses through geospatial processing (e.g., through a spatial join) or hierarchical data conversion (e.g., through a relationship file). Even then, highly-sophisticated computer programs are required and only a very small number of such relationships and analyses can be established because of the intense processing required. And even seemingly obvious relationships cannot be taken for granted, which further prevents data processing, such as in the case of U.S. zip codes, which are not hierarchically related to cities, counties, or states.

The second issue adds an additional barrier to processing and analyzing geospatial data because of the high level of technical knowledge required to perform these tasks. The manual linkage of geospatial data and analysis across publishers, hierarchies, and datasets is a highly sophisticated task requiring highly specialized skills and processing systems. There are two broad types of systems for conducting geospatial data processing and analysis. The first are mapping-based systems and the second are statistical-based systems. The former are highly complex software programs and systems that require extensive technical training in geographical information systems (GIS), to the point that universities offer degrees dedicated solely to learning the skills needed for these systems (e.g., a Bachelor of Science in GIS). The latter requires significant understanding of coding and statistical analysis with the addition of a sophisticated understanding of spatial data theory. With both systems, the linkage of geospatial data and analysis across silos requires sophisticated manual work.

The result of these barriers is that geospatial data processing and analysis remains costly in terms of time, money, and skill and largely simplistic with few insights drawn from the full range of possible data observations available and limited functionality in their application. Simply put, there is an inability to link what should be compatible spatial data across taxonomies (publishers, hierarchies, and datasets) due to the existence of these barriers, the lack of methods and systems for performing integrations and unified analyses.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a data processing system includes one or more memories; one or more network interfaces; and one or more processors coupled to the one or more memories and the one or more network interfaces, the one or more processors, either alone or in combination, configured to: store, in the one or more memories, an integrated hierarchical and spatial database comprising all geospatial units of each geographical entity stored within a plurality of datasets from one or more data publishers, wherein the plurality of datasets is arranged according to a corresponding plurality of hierarchies, wherein the integrated hierarchical and spatial database stores integrated hierarchical and spatial relationship information for each geospatial unit with respect to other geospatial units of each geographical entity stored within the plurality of datasets; receive, via the one or more network interfaces, a query to the integrated hierarchical and spatial database, wherein the query specifies a value for a geographic place, a value for a geospatial unit, a value for a time period, a value for a search topic, or any combination thereof to be applied across the one or more data publishers, the plurality of datasets, and the plurality of hierarchies; and transmit, via the one or more network interfaces, a response to the query, wherein the response includes one or more search results linked together across the one or more data publishers, the plurality of datasets, the plurality of hierarchies, or any combination thereof.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 5A, 5B, and 5C illustrate a more detailed example of a unified, master repository of all geospatial units from all taxonomies for a given geographical entity (the District of Columbia), according to one or more aspects of the disclosure.

FIG. 8 illustrates additional issues with identifying hierarchical and non-hierarchical relationships among different geospatial unit taxonomies, according to one or more aspects of the disclosure.

FIGS. 9A and 9B illustrate another example of issues with identifying hierarchical and non-hierarchical relationships among different geospatial unit taxonomies, according to one or more aspects of the disclosure.

FIG. 12 illustrates an example of documenting hierarchical and of geospatial units in a data matrix structure for a given spatial entity, according to one or more aspects of the disclosure.

FIGS. 14A and 14B illustrate an example geospatial unit relationship matrix documenting all hierarchical relationships of all units for a given geographical entity, according to one or more aspects of the disclosure.

FIGS. 15A and 15B illustrate an example of identifying of geospatial units in matrix form for a given geographical entity, according to one or more aspects of the disclosure.

FIGS. 16A to 16C illustrate an example of identifying different types of hierarchical and non-hierarchical relationships that may exist between geospatial units in matrix form for a given geographical entity, according to one or more aspects of the disclosure.

FIGS. 17A to 17C illustrate an example of integrating geospatial units from different taxonomies and documenting various hierarchical and non-hierarchical relationships in matrix form, according to one or more aspects of the disclosure.

FIGS. 18A and 18B illustrate an example of a geospatial unit relationship matrix documenting all hierarchical and non-hierarchical relationships for all units for a given geographical entity, according to one or more aspects of the disclosure.

FIGS. 19A and 19B illustrate an example of integrating and aggregating point-based locational data into unit-based repositories of geo-tagged items within a geographical entity, according to one or more aspects of the disclosure.

FIGS. 23A and 23B illustrate an example of searching and filtering geospatial unit and locational data according to a four-by-four dimensional matrix, according to one or more aspects of the disclosure.

FIG. 24 illustrates an example of four-by-four dimensional searching and filtering of geospatial unit and locational data, according to one or more aspects of the disclosure.

FIGS. 25A and 25B illustrate a specific example of four-by-four dimensional searching and filtering of geospatial unit and locational data, according to one or more aspects of the disclosure.

FIGS. 26A and 26B illustrate example results (a data table and map visualization) of the four-by-four dimensional search and filtering system, according to one or more aspects of the disclosure. Specifically, FIG. 26A illustrates the geospatial unit and locational data illustrated in FIGS. 25A and 25B and FIG. 26B illustrates an alternative example utilizing different spatial unit types for the same entity and theme, according to one or more aspects of the disclosure.

DETAILED DESCRIPTION

Figure 1:
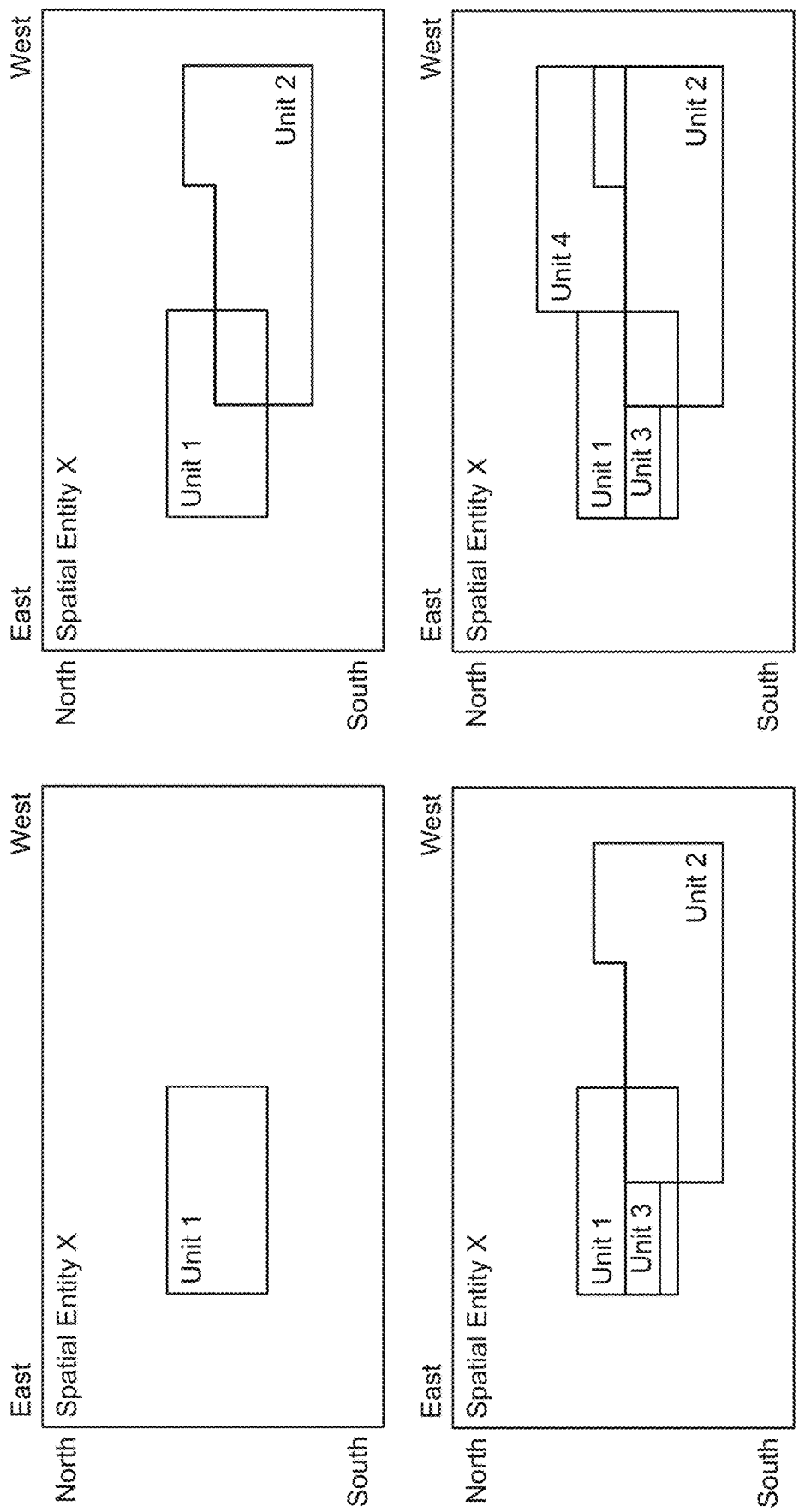
FIG. 1 illustrates an example of spatial relationships of hierarchical and non-hierarchical geospatial units for a given geographical entity.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As noted above, current geospatial and locational data processing and analysis systems face two primary hurdles that significantly slow the speed of processing the data and limit the ability to perform comprehensive and sophisticated analyses. First, geospatial data are siloed across publishers of the data, formal relationship hierarchies, and individual datasets. Second, current systems for geospatial data processing and analysis require significant technical expertise to perform any processing or analysis. These hurdles prevent users from seamlessly transitioning between data from different publishers, hierarchies (including different geographic units), and datasets while performing analysis, and from analyzing data across these taxonomies.

The first issue of data silos creates a significant barrier to processing and analysis by preventing the linkage of geospatial units to their full range of relevant data via the units' full set of formal, hierarchical and informal, spatial relationships, except by individual and manual conversions performed ex post by the user. Generally, each individual geospatial datum—be it a unit datum or an item datum with geotagged/locational information—can be placed within one or several hierarchical systems and also within one or several spatial systems. In other words, each geospatial data observation can be linked to several other geospatial units through formal, hierarchical relationships (e.g., a data point about county x is also a component of state y) or informal, spatial relationships (e.g., a zip code x overlaps with a census tract y, but is from a different hierarchy and or organizational system). However, the siloed nature of data means that a user cannot identify those relationships prima facie or draw analytical conclusions from them without first performing independent queries to each dataset, hierarchy, and publisher (e.g., a zip code dataset from a first publisher and a census tract dataset from a second publisher) and then manually linking the data and analyses through geospatial processing (e.g., through a spatial join) or hierarchical data conversion (e.g., through a relationship file).

The second issue adds an additional barrier to processing and analyzing geospatial data because of the high level of technical knowledge required to perform these tasks. The manual linkage of geospatial data and analysis across publishers, hierarchies, and datasets is a highly sophisticated task requiring highly-specialized skills and processing systems. There are two broad types of systems for conducting geospatial data processing and analysis. The first are mapping-based systems and the second are statistical-based systems. The former are highly complex software programs and systems that require extensive technical training in geographical information systems (GIS), to the point that universities offer degrees dedicated solely to learning the skills needed for these systems. The latter requires significant understanding of coding and statistical analysis with the addition of a sophisticated understanding of spatial data theory. With both systems, the linkage of geospatial data and analysis across silos requires sophisticated manual work.

For example, FIG. 1 illustrates an example of spatial relationships of hierarchical and non-hierarchical geospatial units for a given geographical entity (also referred to as a "spatial entity"). As shown in FIG. 1, an example Spatial Entity X includes four example geospatial units, denoted "Unit 1," "Unit 2," "Unit 3," and "Unit 4." In the example of FIG. 1. Unit 1 and Unit 3 have a hierarchical relationship, whereas Unit 1, Unit 2, and Unit 4, while spatially overlapping, do not have a hierarchical relationship.

Figure 2:
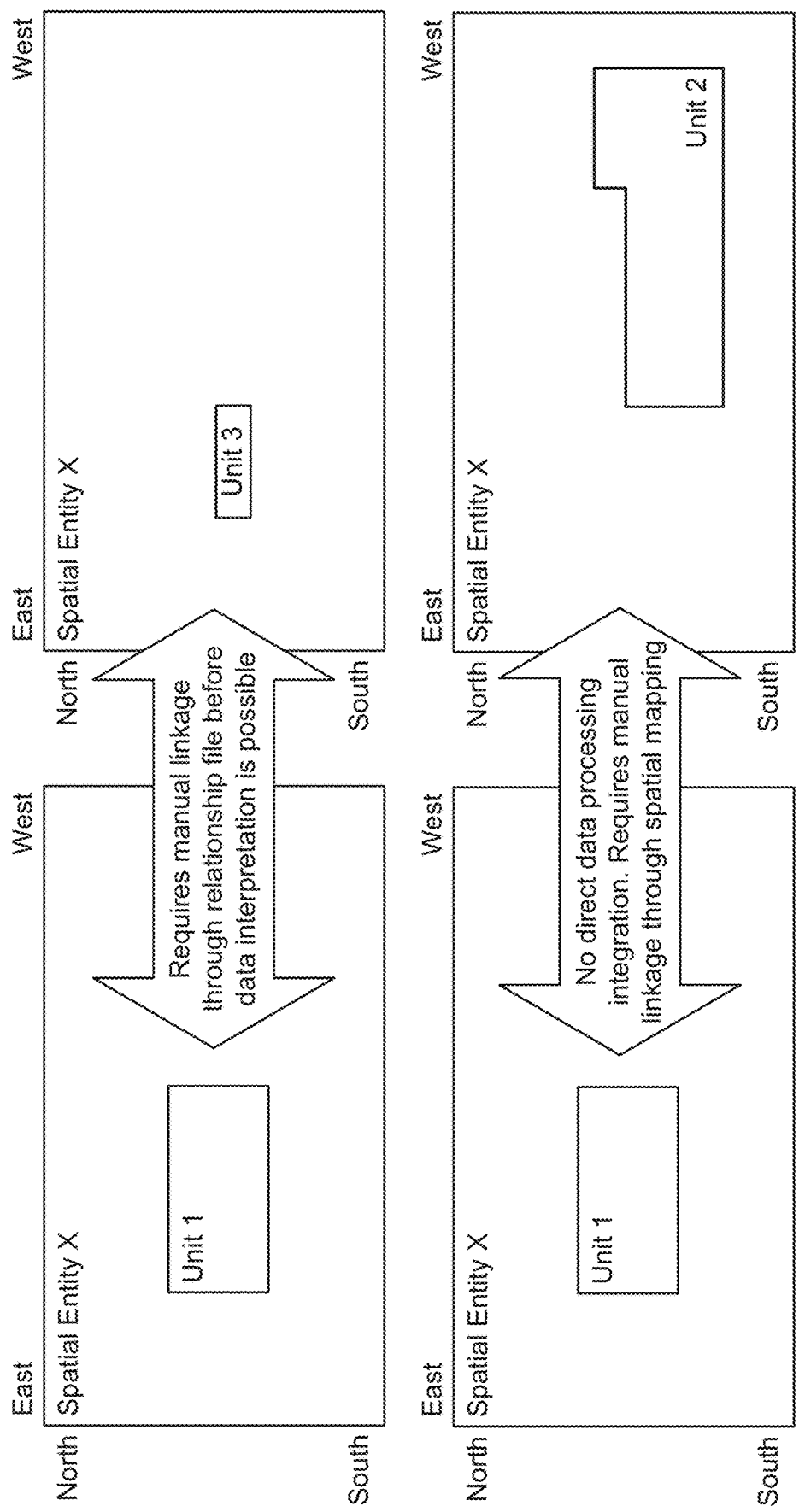
FIG. 2 illustrates various issues with identifying and integrating the example geospatial units illustrated in FIG. 1 according to hierarchical and non-hierarchical relationships.

FIG. 2 illustrates various issues with identifying and integrating the example geospatial units illustrated in FIG. 1 according to hierarchical and non-hierarchical relationships. As shown in FIG. 2. Unit 1 and Unit 3, which have a hierarchical relationship, require manual linkage through relationship files before data interpretation is possible. For Unit 1 and Unit 2, which do not have a hierarchical relationship, there is no direct data processing integration and they require manual linkage through spatial mapping.

The result of the barriers described above is that geospatial data processing and analysis remains costly in terms of time, money, and skill and largely simplistic with few insights drawn from the full range of possible data observations available and limited functionality in their application. Simply put, there is an inability to link what should be compatible spatial data across taxonomies (publishers, hierarchies, and datasets) due to the existence of these barriers, the lack of methods and systems for performing integrations and unified analyses.

The present disclosure provides techniques to enable users to perform sophisticated and unified processing and analyses of geospatial data from across taxonomies (e.g., different publishers, hierarchies, datasets, etc.) by aggregating and integrating data across hierarchical and non-hierarchical relationships. At a high level, the techniques of the present disclosure integrate different types of unique geospatial units from different taxonomies for a given geographic entity to allow for the unified processing, analysis, and visualization of geospatial and locational data for that geographic entity. The disclosed techniques create various relationship maps (conceptual, data matrix-based, etc.) across all geospatial units and taxonomies. The disclosed system may utilize that integration to enable unified processing of information for analysis and visualization, including specific applications for four-by-four dimensional searching and filtering of geospatial and locational data and for the dynamic unit-based rendering of point-based locational data.

Figure 3:
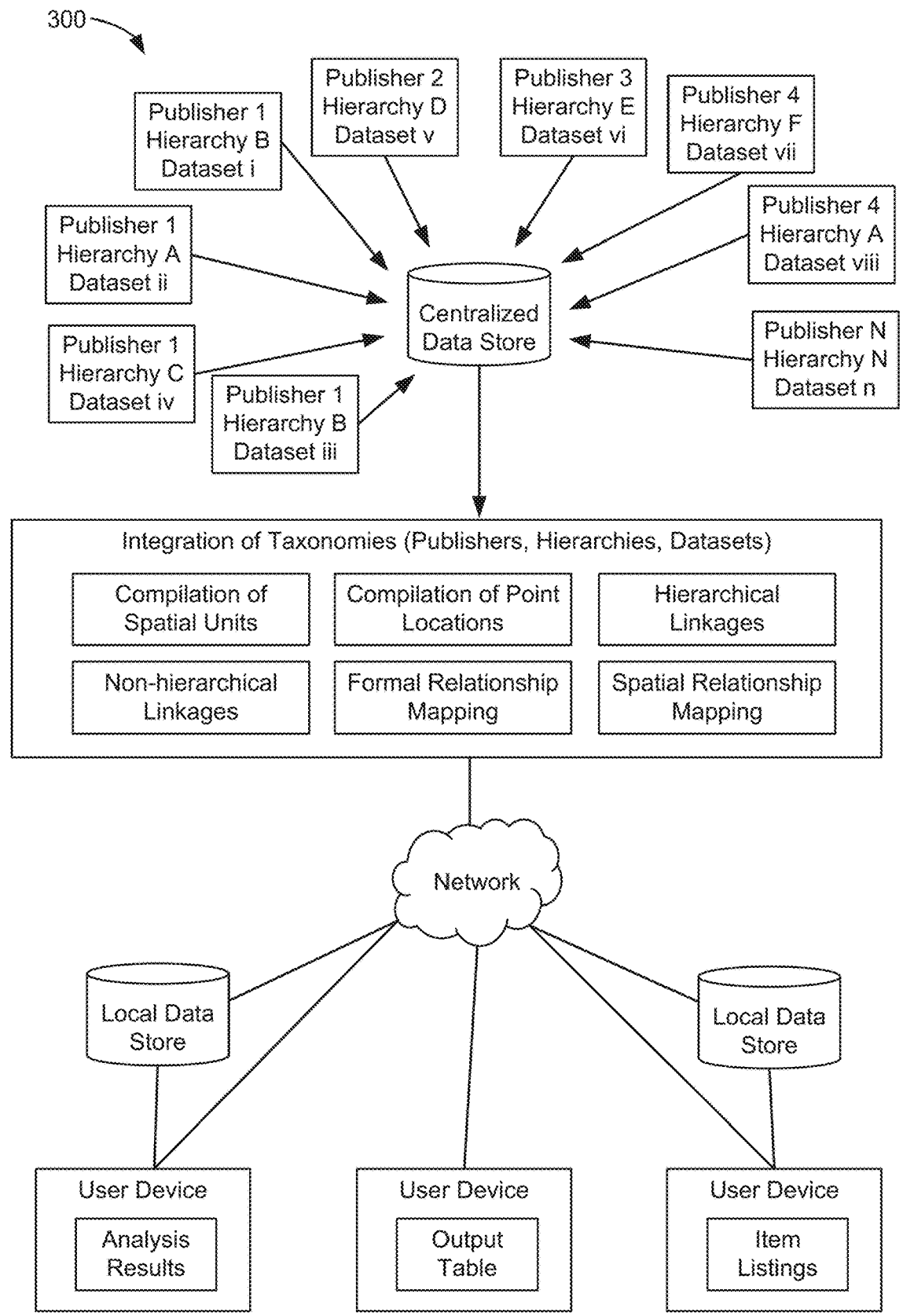
FIG. 3 illustrates an example system for the integration, processing, analysis, and visualization of geospatial and locational data across different hierarchical and non-hierarchical geographical systems and relationships, according to one or more aspects of the disclosure.

FIG. 3 illustrates an example system 300 for the integration, processing, analysis, and visualization of geospatial and locational data across different hierarchical and non-hierarchical geographical systems and relationships, according to one or more aspects of the disclosure. As shown in FIG. 3, multiple datasets (denoted i to n) from multiple publishers (denoted 1 to N) having different hierarchies (denoted A to N) are aggregated in a centralized data store/repository. The aggregated taxonomies are then integrated, as described further herein, resulting in, for example, compilation of geospatial units, compilation of point locations, hierarchical linkages, non-hierarchical linkages, formal relationship mapping, and spatial relationship mapping. The centralized data store/repository may be, or be stored on, one or more physical data repositories accessible over a network, such as the Internet (e.g., "Cloud" storage). In some cases, the integration functionality may be implemented by one or more servers having access to the centralized data store/repository (e.g., a "Cloud" server). The integrated data can then be accessed (e.g., over a network, such as the Internet) by end user devices for analysis and visualization. For example, the integrated data may be accessed via a web interface of the one or more servers or via an application installed on a user device. Alternatively, a user device may access the centralized data store/repository and implement the integration functionality (e.g., via an application installed on the user device).

Referring to the integration of geospatial and locational data from different taxonomies (e.g., different publishers, hierarchies, datasets, etc.) in greater detail, the disclosed system first identifies and compiles all unique geospatial units into a master geospatial unit database for a given spatial entity. That is, the disclosed system identifies all geospatial units from across all taxonomies within a spatial entity and compiles them into an integrated database of geospatial units.

In generating the master geospatial unit database, the disclosed system may assign particular geospatial features that permit integration across publishers, hierarchies, and datasets without the need for formal hierarchical order or spatial aggregation specifications. These include, but are not limited to: 1) an identification code (e.g., geographic identifier (GEOID), Code, etc.) of the geospatial unit, 2) the formal name of the geospatial unit according to its publisher, 3) the type of the geospatial unit according to its hierarchical system, and 4) any geographical features or geometry of the geospatial unit (e.g., latitudinal and longitudinal coordinates for the unit's centroid and borders, land area, water area, geometric shape (e.g., polygon, multi-polygon, etc.), etc.). Utilizing the information stored in the master geospatial unit database, hierarchical relationships can be noted while non-hierarchical relationships can be determined based on geometry, without creating data loss or duplication because of identical unit features (e.g., name, identifier, etc.) that may be contained in siloed taxonomies (e.g., where an identical geographical identification code is used by two separate publishers to denote two distinct unit entities).

Figure 4:
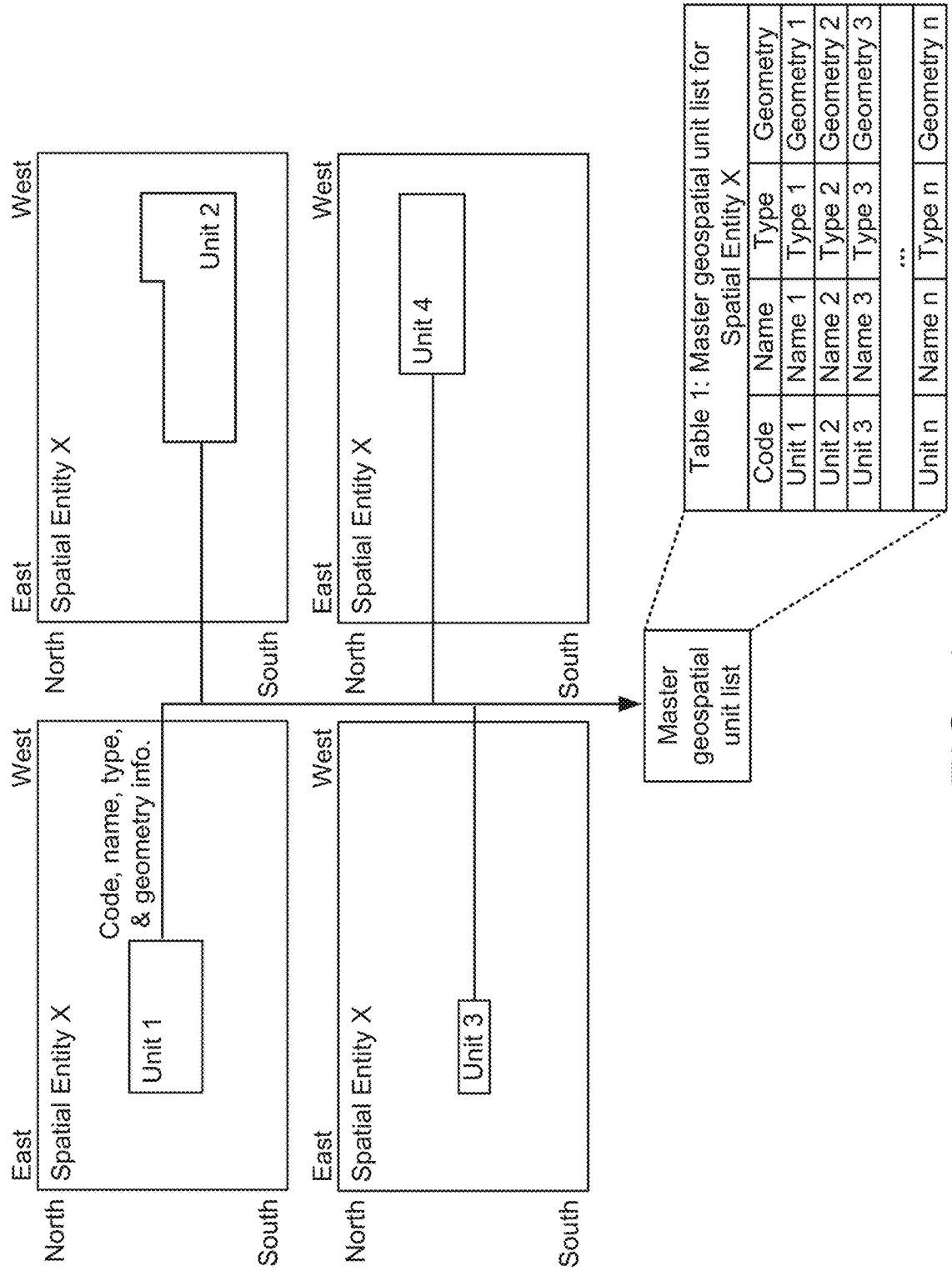
FIG. 4 illustrates an example of integrating all geospatial units from all taxonomies for a given spatial entity into a unified geospatial unit list, according to one or more aspects of the disclosure.

FIG. 4 illustrates an example of integrating all geospatial units from all taxonomies for a given spatial entity into a unified geospatial unit list, according to one or more aspects of the disclosure. In the example of FIG. 4, the example geospatial units Unit 1, Unit 2, Unit 3, and Unit 4 of Spatial Entity X of FIG. 1 are integrated into a master geospatial unit list that includes the fields "Code," "Name," "Type," and "Geometry." FIGS. 5A, 5B, and 5C illustrate a more detailed example of a unified, master repository of all geospatial units from all taxonomies for a given geographical entity, according to one or more aspects of the disclosure. Specifically, in the example of FIGS. 5A and 5B, the example geographical entity is Washington, D.C.

The disclosed system then creates a master geospatial intersection database for a given spatial entity, which allows all spatial intersection/overlap relationships between units for a given spatial entity to be identified and compiled. This database shows how each geospatial unit relates to all other geospatial units in terms of its spatial features (e.g., geometry). This stage is agnostic to each unit's hierarchical relationships and documents relationships based solely on each geospatial unit's spatial features, though it can also capture hierarchical relationships. The database is constructed by performing an N×N matrix analysis for the presence of spatial overlap for the geospatial units and their geometries for a given spatial entity. This creates a matched, unit-to-unit list of records indicating x-to-y pairings where units overlap in space and, thus, possess spatial linkages between each other.

Figure 6:
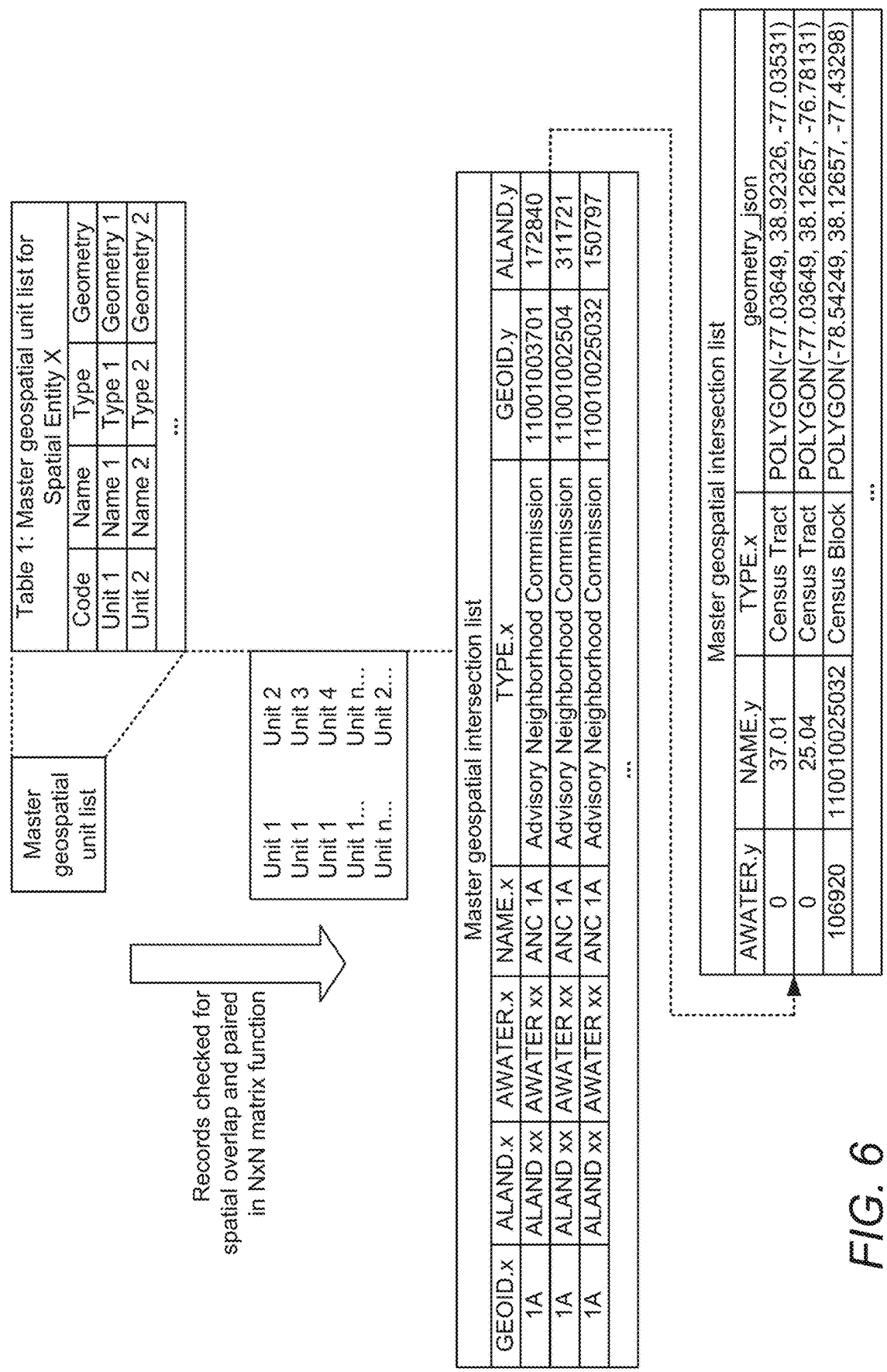
FIG. 6 illustrates an example of identifying non-hierarchical spatial relationships among all geospatial units for a given geographical entity, according to one or more aspects of the disclosure.

FIG. 6 illustrates an example of identifying non-hierarchical spatial relationships among all geospatial units for a given geographical entity, according to one or more aspects of the disclosure. As shown in FIG. 6, the disclosed system checks for spatial overlap among the geospatial units and generates a master geospatial intersection list.

Figure 7:
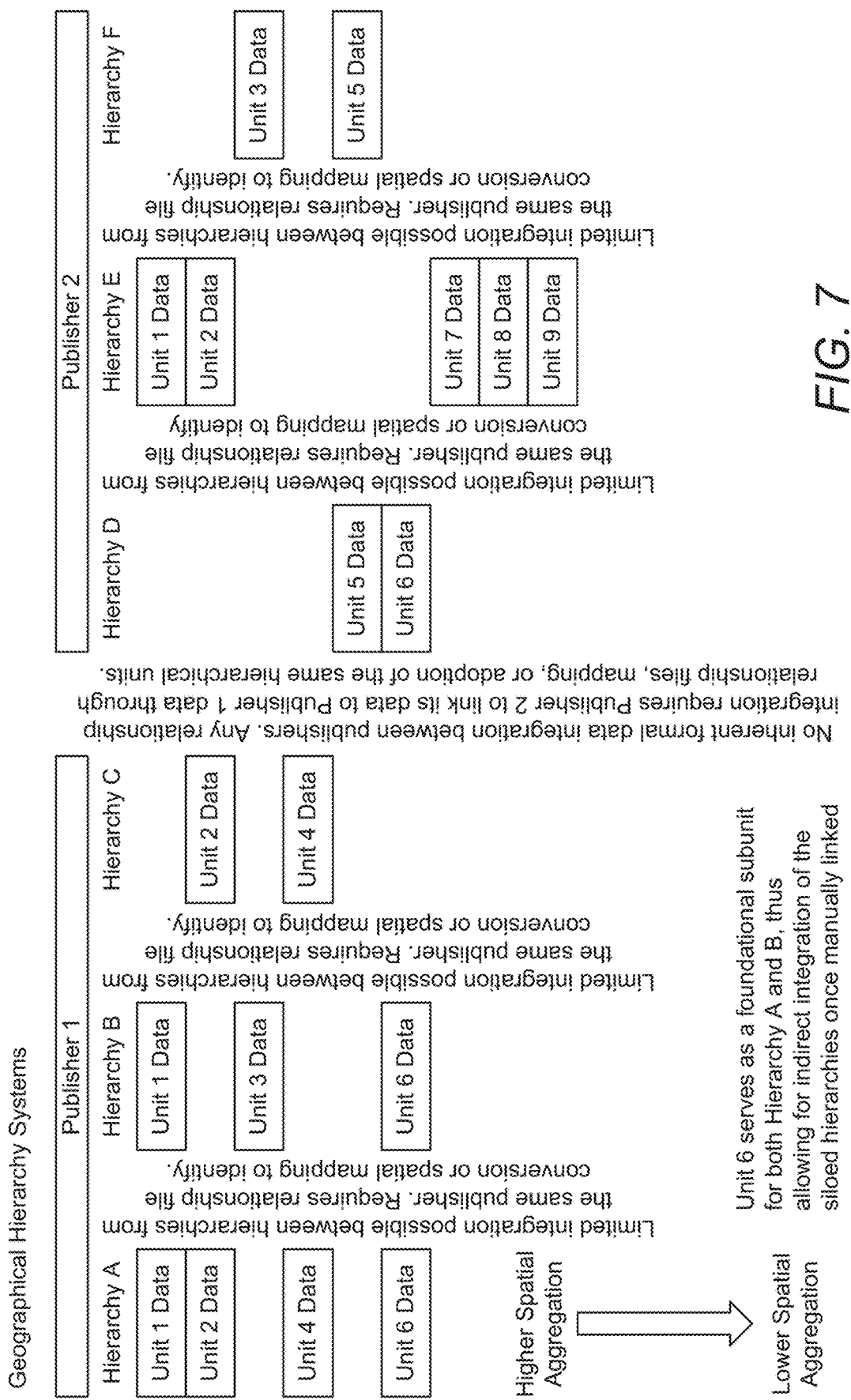
FIG. 7 illustrates various issues with identifying hierarchical and non-hierarchical relationships among different geospatial unit taxonomies, according to one or more aspects of the disclosure.

FIG. 7 illustrates various issues with identifying hierarchical and non-hierarchical relationships among different geospatial unit taxonomies, according to one or more aspects of the disclosure. As shown in FIG. 7, only limited integration is possible between hierarchies from the same publisher. Any integration requires relationship file conversion or spatial mapping to identify. Further, between publishers, there is no inherent formal data integration. Any relationship integration requires one publisher to link its data to another publisher's data through relationship files, mapping, or adoption of the same hierarchical units.

FIG. 8 illustrates additional issues with identifying hierarchical and non-hierarchical relationships among different geospatial unit taxonomies, according to one or more aspects of the disclosure. As shown in FIG. 8, within the same organizational system, there may be separate hierarchies with no formal relationship, despite having the same foundational sub-units. Further, between organizational systems, there is no formal relationship or integration.

Figure 9A:
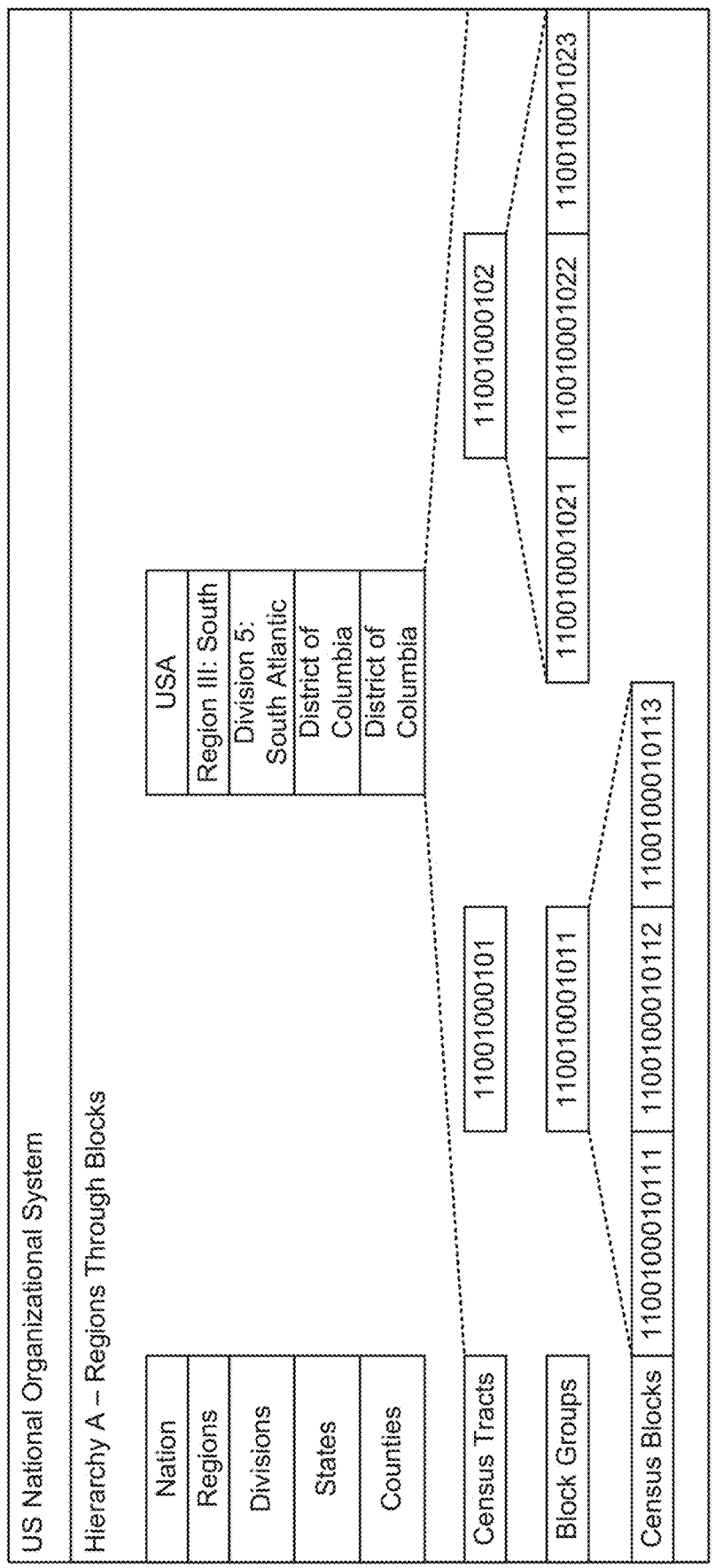

FIGS. 9A and 9B illustrate another example of issues with identifying hierarchical and non-hierarchical relationships among different geospatial unit taxonomies, according to one or more aspects of the disclosure. Specifically, in the example of FIGS. 9A and 9B, the example geospatial units are related to the example geographical entity of Washington, D.C. As shown in FIGS. 9A and 9B, there is no formal relationship or integration between organizational systems, despite a shared foundational sub-unit (Census Blocks). In FIGS. 9A and 9B, the shared Census Block unit indicates the presence of informal relationships.

Accordingly, the disclosed system may create a unified spatial aggregation map of hierarchical and non-hierarchical relationships and linkages for all geospatial units. This stage integrates the formal, hierarchical relationships (relationships between units and their constituent, hierarchical sub-units in the same aggregational track; e.g., census block 1100100010111 is a constituent, hierarchical sub-unit of block group 110010001011) and informal, spatial relationships (relationships between units with no formal or hierarchical basis, but that overlap in space; e.g., zip Code 20001 residing within the county of District of Columbia) across publishers, hierarchies, and datasets into a single, conceptual spatial map indicating the relative spatial aggregation and linkages between a given geospatial unit and all other geospatial units. This stage provides a comprehensive illustration of all formal, hierarchical and informal, spatial relationships for all units within a given spatial entity and can be applied to all spatial entities. This, in turn, allows for the provision of two key methodological steps. First, it indicates the relative, conceptual, and spatial aggregation (e.g., size) of all units compared to all other units regardless of publisher, hierarchy, and unit type. Second, it allows for all publisher-based relationships (both formal and informal) to be mapped by identifying common/shared unit types across hierarchies.

Figure 10:
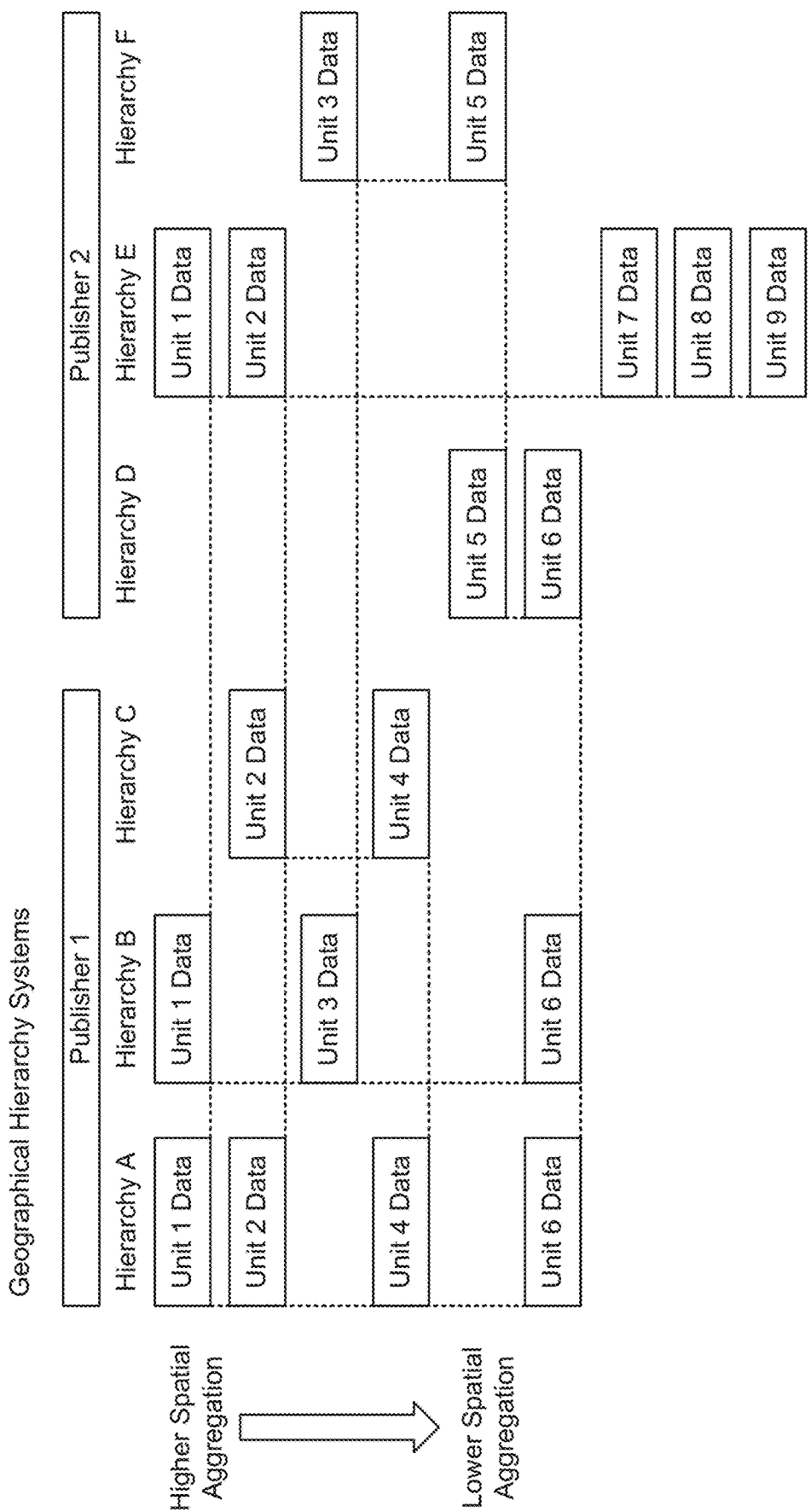
FIG. 10 illustrates an example of identifying hierarchical and of geospatial units and linking units across taxonomies, according to one or more aspects of the disclosure.

FIG. 10 illustrates an example of identifying hierarchical and non-hierarchical relationships of geospatial units and linking units across taxonomies, according to one or more aspects of the disclosure. As shown in FIG. 10, different data units at different levels of hierarchy are aligned across hierarchies and across publishers.

Figure 11:
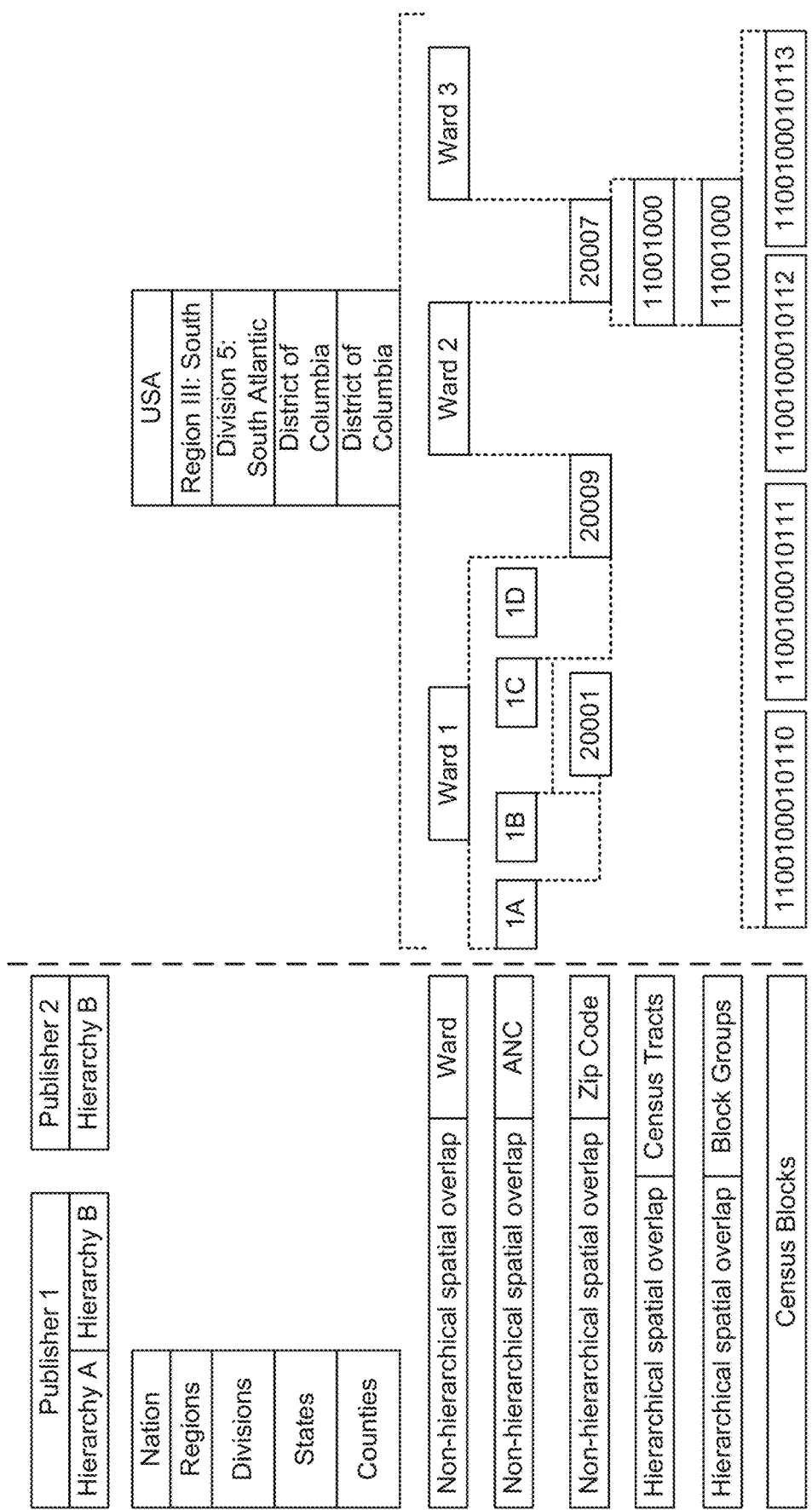
FIG. 11 illustrates an example of integrating all geospatial units for a given geographical entity across all taxonomies based on hierarchical and non-hierarchical relationships, according to one or more aspects of the disclosure.

FIG. 11 illustrates an example of integrating all geospatial units for a given geographical entity across all taxonomies based on hierarchical and non-hierarchical relationships, according to one or more aspects of the disclosure. Specifically, FIG. 11 illustrates an example of integrating all geospatial units for the example spatial entity of Washington, D.C.

The disclosed system may then create an integrated hierarchical and geospatial unit relationship matrix, which converts all unique spatial relationships (both formal and informal) for all geospatial units within a spatial entity into a set of variables for data processing. This matrix codifies all hierarchical and non-hierarchical relationships and comprises an N×N matrix of all unique geospatial units from all publishers, hierarchies, and datasets for a given spatial entity. The matrix indicates the relationship (hierarchical versus spatial, full versus partial overlap) of all units with all other units through variables. The matrix construction first lays out hierarchical relationships and then spatial relationships following an algorithmic decision tree for identifying each formal relationship/hierarchy and each possible informal/spatial relationship.

FIG. 12 illustrates an example of documenting hierarchical and non-hierarchical relationships of geospatial units in a data matrix structure for a given spatial entity, according to one or more aspects of the disclosure. As shown in FIG. 12, for the example Spatial Entity X illustrated in FIG. 1, a matrix/table of hierarchical relationships shows the hierarchy to which Unit 1. Unit 2, Unit 3, and Unit 4 belong, and a matrix/table of spatial relationships shows the spatial overlap among Unit 1, Unit 2, Unit 3, and Unit 4.

Figure 13A:
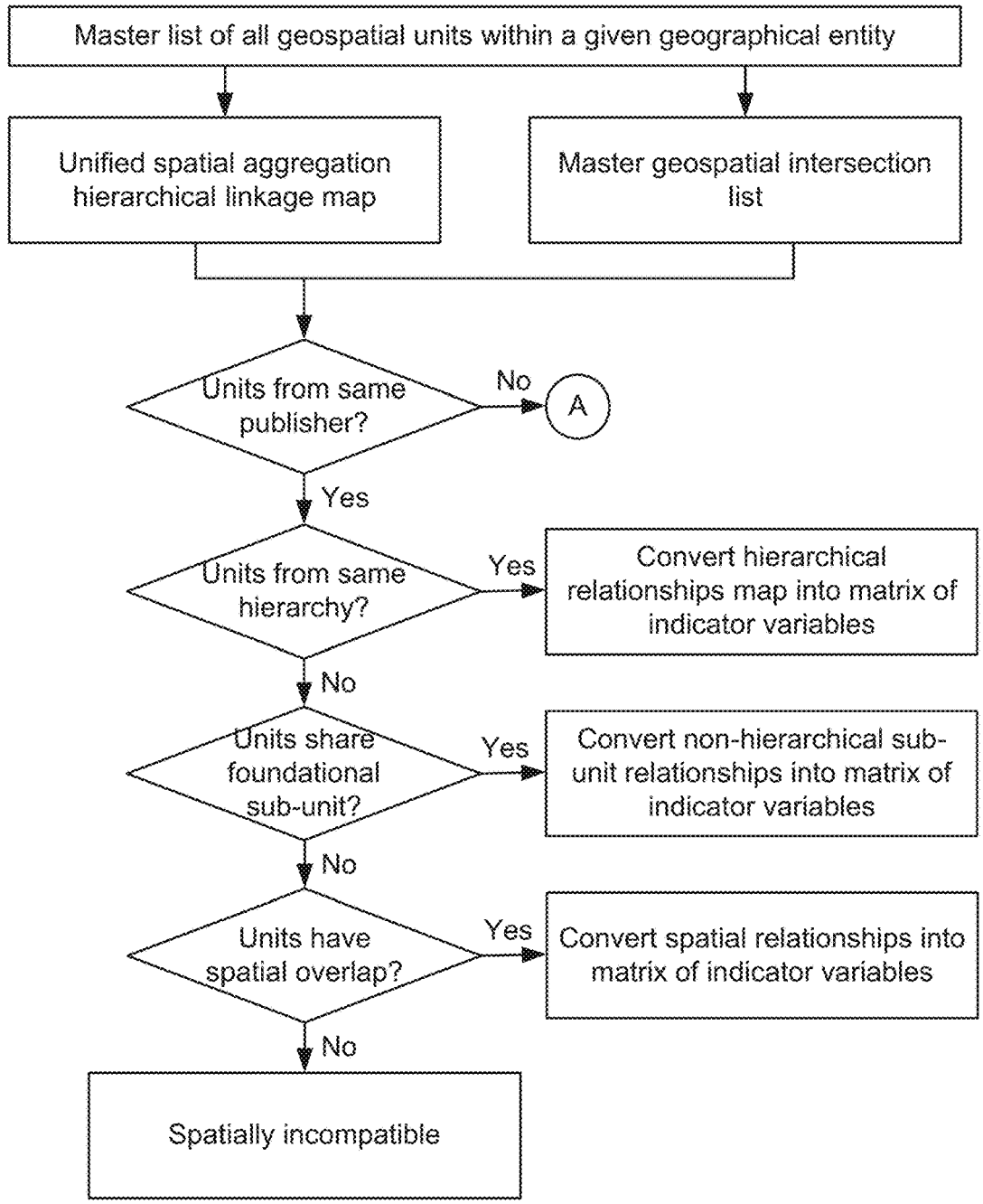
FIGS. 13A and 13B illustrate an example decision tree for processing hierarchical and of geospatial units in data form, according to one or more aspects of the disclosure.
Figure 13B:
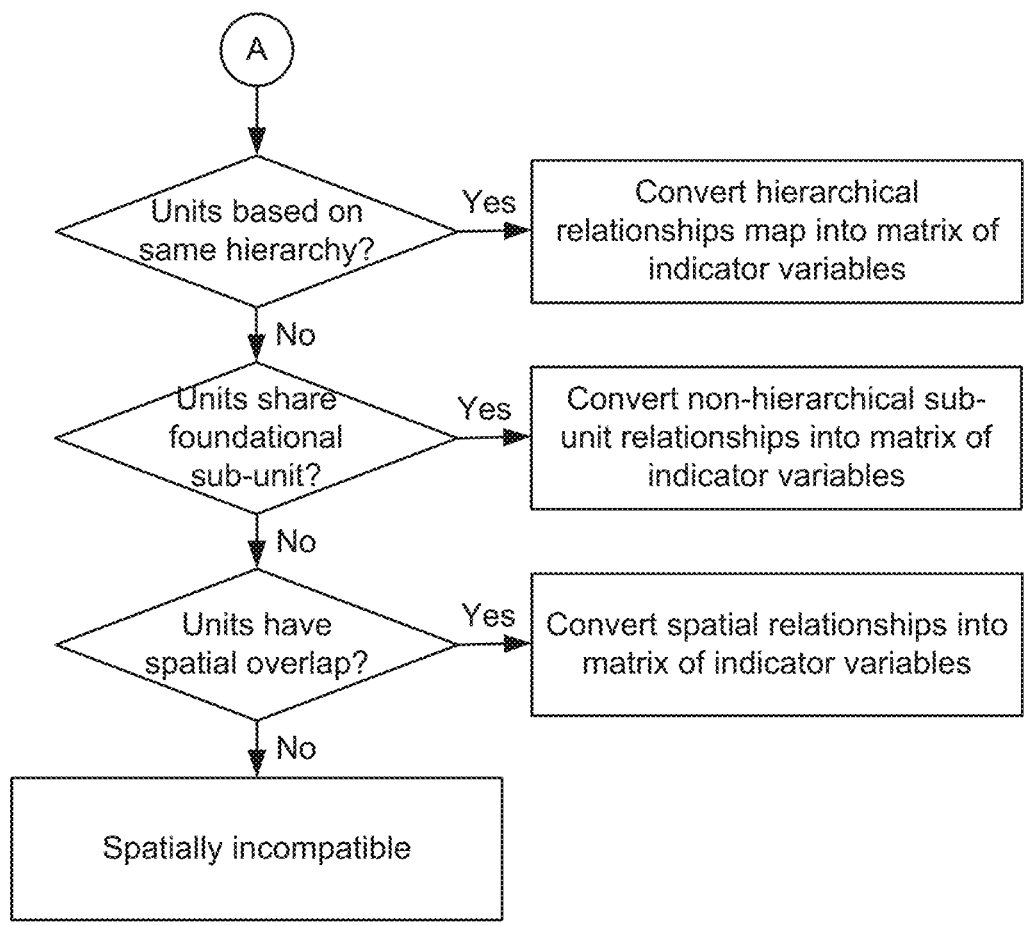

FIGS. 13A and 13B illustrate an example decision tree for processing hierarchical and non-hierarchical relationships of geospatial units in data form, according to one or more aspects of the disclosure. As shown in FIG. 13A, a unified spatial aggregation hierarchical linkage map (e.g., as illustrated in FIG. 10) and a master geospatial intersection list (e.g., as illustrated in FIG. 6) are determined from a master list of all geospatial units within a geographical entity (e.g., as illustrated in FIG. 4). If two or more geospatial units are from the same publisher and have the same hierarchy, share a foundational sub-unit (e.g., where Hierarchies A and B both use Census Blocks as their foundational (lowest aggregation) geospatial unit), or spatially overlap, then the determined relationship is converted to a matrix of indicator/categorical variables. If the two or more units are from the same publisher but have none of the above relationships, then they are determined to be spatially incompatible. Or more precisely, they are incompatible from an integrated spatial data processing standpoint because the units have no inherent relationship through which a query can link them for data processing and analytical purposes.

As shown in FIG. 13B, if two or more geospatial units are from different publishers but have the same hierarchy, share a foundational sub-unit, or spatially overlap, then the determined relationship is converted to a matrix of indicator values. If the two or more units are from different publishers and have none of the above relationships, then they are determined to be spatially incompatible.

FIGS. 14A and 14B illustrate an example geospatial unit relationship matrix documenting all hierarchical relationships of all units for a given geographical entity, according to one or more aspects of the disclosure. FIGS. 15A and 15B illustrate an example of identifying non-hierarchical relationships of geospatial units in matrix form for a given geographical entity, according to one or more aspects of the disclosure. As shown in FIGS. 15A and 15B, the different types of hierarchical and spatial overlap relationships are indicated in the matrix.

FIGS. 16A to 16C illustrate an example of identifying different types of hierarchical and non-hierarchical relationships that may exist between geospatial units in matrix form for a given geographical entity, according to one or more aspects of the disclosure. As shown in FIGS. 16A to 16C, some geospatial units may be in the same organizational system but non-hierarchical and have no informal spatial overlap (e.g., a county in state x versus a congressional district in state y). Other units may be in the same organizational system but non-hierarchical and have an informal spatial overlap (e.g., a county and a congressional district in state x). Some units may be in different organizational systems and hierarchies and have an informal spatial overlap (e.g., a ward in city x and a zip code in city x). Other units may be in different organizational systems and hierarchies and have no informal spatial overlap (e.g., a ward in city x and a zip code in city y).

FIGS. 17A to 17C illustrate an example of integrating geospatial units from different taxonomies and documenting various hierarchical and non-hierarchical relationships in matrix form, according to one or more aspects of the disclosure. As shown in FIGS. 17A to 17C, for some units, there may be no integration possible for a spatial-based query. For other units, integration may be possible through spatial join and weighting.

FIGS. 18A and 18B illustrate an example of a geospatial unit relationship matrix documenting all hierarchical and non-hierarchical relationships for all units for a given geographical entity, according to one or more aspects of the disclosure. As shown in FIGS. 18A and 18B, a value of "1" indicates a hierarchical spatial overlap, a value of "2" indicates the same hierarchical system with informal spatial overlap (i.e., because they are from different hierarchical tracks), and a value of "3" indicates a different hierarchical system with informal spatial overlap.

The disclosed system may further create an integrated geospatial unit-based repository of geo-tagged items located within a geographical entity. This stage links individual, non-spatial unit, geo-tagged items (e.g., locational observations) and point-based observations with real-time information to their relevant geospatial units and allows for association of these item records with their full set of hierarchical and spatial relationships. Through the linking of the locational observations to their respective units, the disclosed system also allows the aggregation of real-time locational data (e.g., inventory stock or traffic patterns) at any geospatial unit aggregation without the need for manual linkage of point or flow locational data to individual units or entities. It further allows for the dynamic changing of aggregation between geospatial units.

Figure 19A:
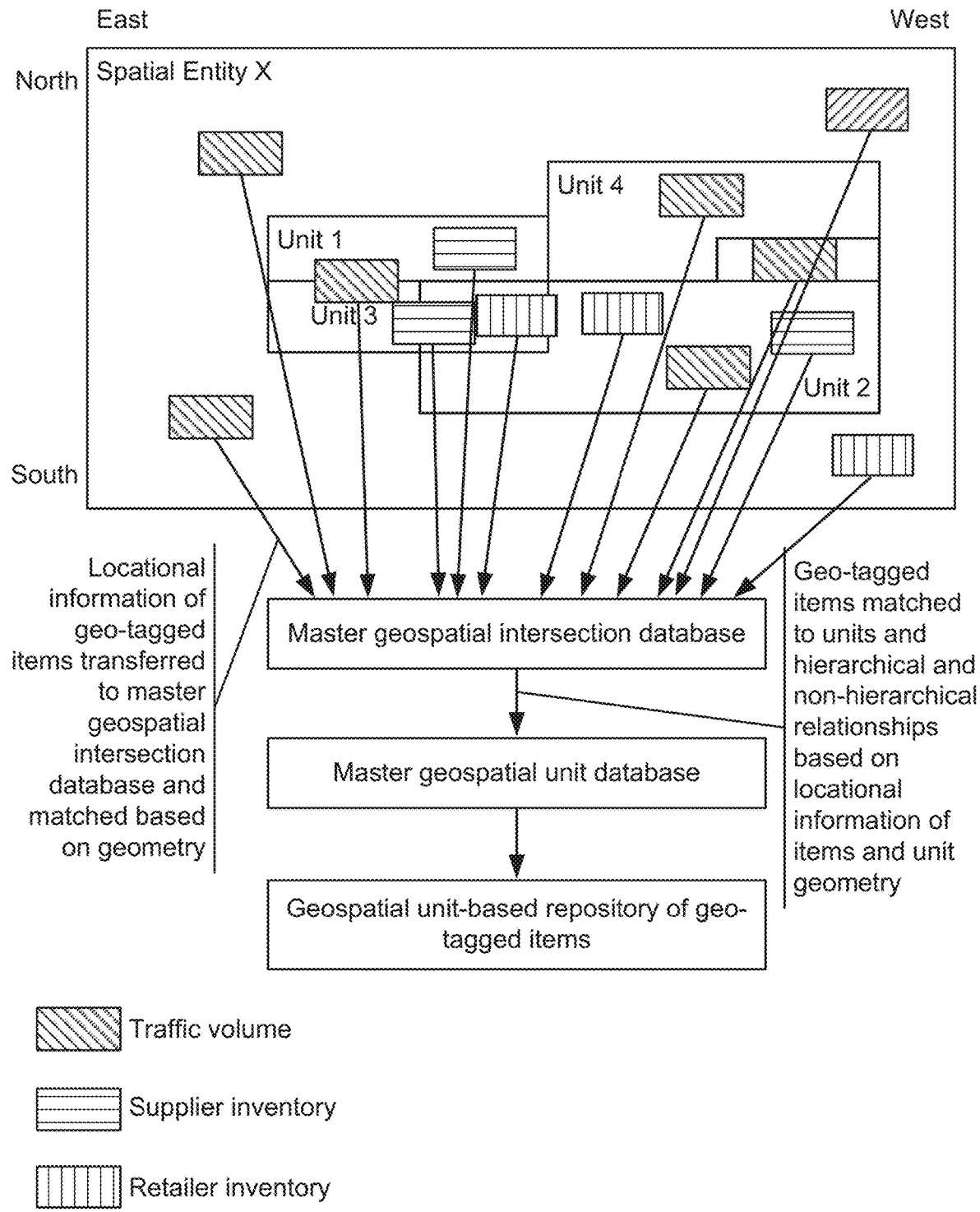

FIGS. 19A and 19B illustrate an example of integrating and aggregating point-based locational data into unit-based repositories of geo-tagged items within a geographical entity, according to one or more aspects of the disclosure. As shown in FIG. 19A, locational information of geo-tagged items are transferred to a master geospatial intersection database and matched based on geometry. Geo-tagged items are then matched to geospatial units and hierarchical and non-hierarchical relationships based on locational information of items and unit geometry. FIG. 19B illustrates an example of a resulting geospatial unit-based repository of geo-tagged items.

Figure 20:
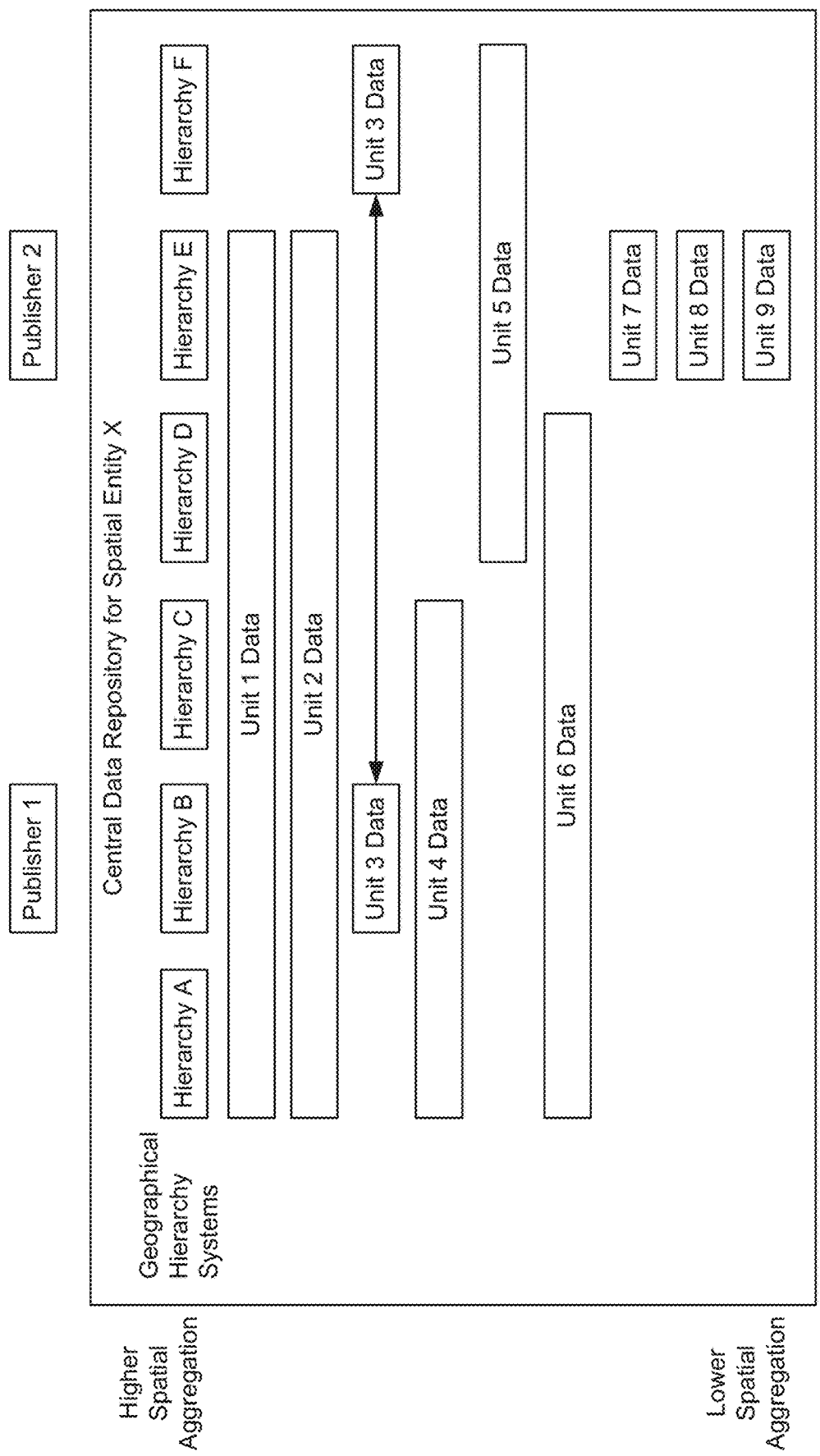
FIG. 20 illustrates an example of a unified geospatial unit and locational observation database for a given spatial entity with all hierarchical and non-hierarchical relationships documented, according to one or more aspects of the disclosure.

FIG. 20 illustrates an example of a unified geospatial unit and locational observation database for a given spatial entity with all hierarchical and non-hierarchical relationships documented, according to one or more aspects of the disclosure. More specifically, FIG. 20 illustrates an example central data repository for an example Spatial Entity X that includes locational observations (locational data) from two different publishers (denoted "Publisher 1" and "Publisher 2"). This central data repository allows for the simultaneous and integrated querying and processing of data across taxonomies. As shown in FIG. 20, the because Hierarchy B and Hierarchy F both include Unit 3 Data, these two hierarchies can be linked via the shared geospatial unit (i.e., Unit 3).

The disclosed system enables the unified analysis of geospatial and locational data from different taxonomies across all hierarchical and non-hierarchical spatial relationships. Utilizing the disclosed system, any geospatial or locational data for a given spatial entity can be stacked or bound together without requiring additional notation, categorization, or relationship mapping by relying on the documented relationships identified in the foregoing stages. The centralized repository of data is filtered through the integrated hierarchical and geospatial unit linkage information at the time of querying by matching the queried element (s) to the relevant elements of the linkage information to apply those relationships and then conduct analysis across taxonomies. This system allows for unified queries for any geography, geospatial unit, time period, and or topic area to be applied across all datasets and hierarchies rather than using sequential queries by publisher, hierarchy, and dataset. As part of this stage, a user is able to identify when an analysis is incompatible across different units based on the hierarchical and spatial relationships of a unit.

Figure 21A:
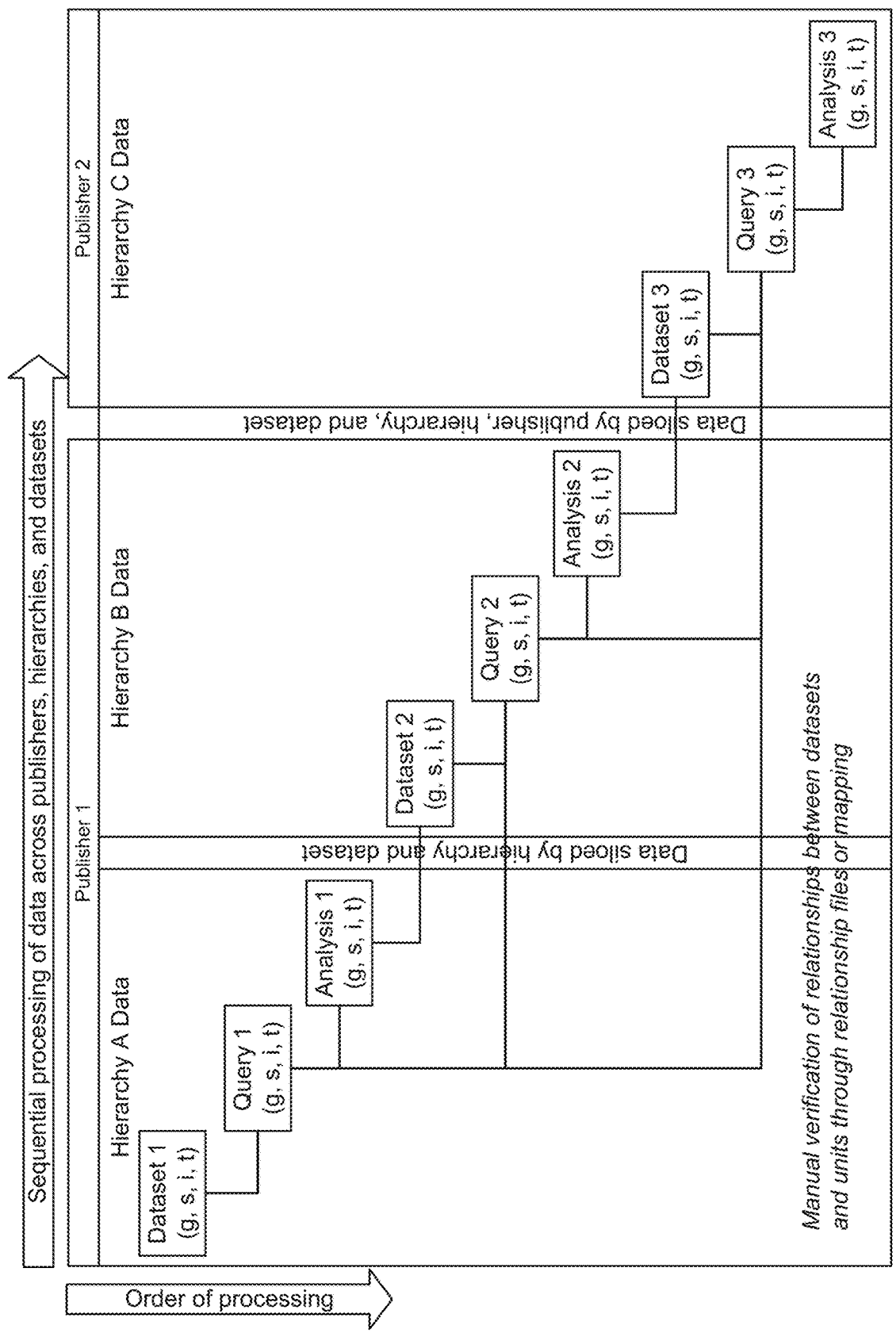
FIG. 21A illustrates an example of how geospatial unit and locational data for a given geospatial unit is processed without the use of the system disclosed herein.
Figure 21B:
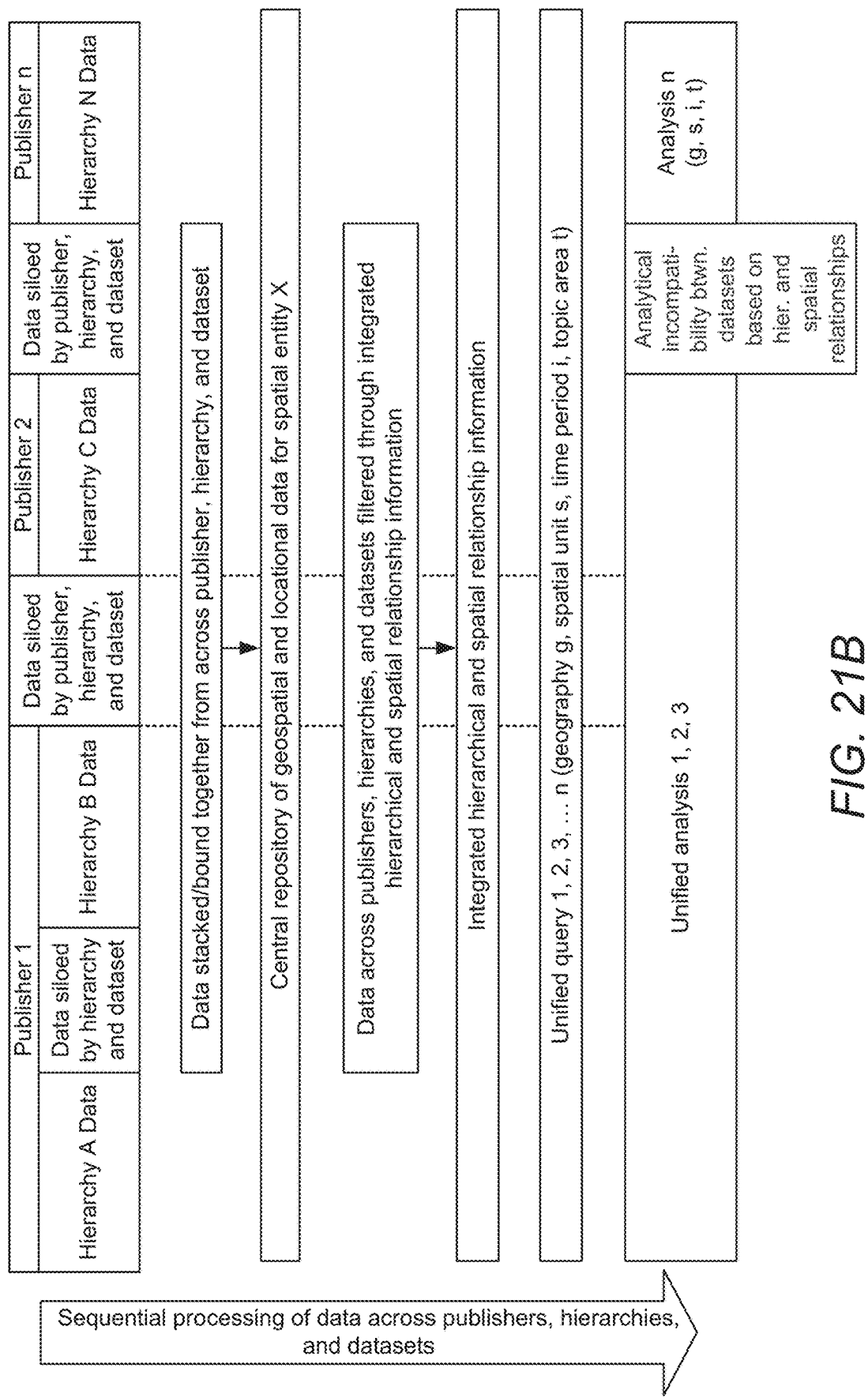
FIG. 21B illustrates an example of the unified processing of all integrated geospatial unit and locational data of a geospatial unit across taxonomies based on documented hierarchical and non-hierarchical relationships, according to one or more aspects of the disclosure.

FIG. 21A illustrates an example of how geospatial unit and locational data for a given geospatial unit is processed without the use of the system disclosed herein. As shown in FIG. 21, existing techniques for the processing of geospatial unit and locational data for a given geospatial unit are based on sequential identification, querying, and analysis of data across taxonomies. In contrast, FIG. 21B illustrates an example of the unified processing of all integrated geospatial unit and locational data of a geospatial unit across taxonomies based on documented hierarchical and non-hierarchical relationships, according to one or more aspects of the disclosure.

Figure 22A:
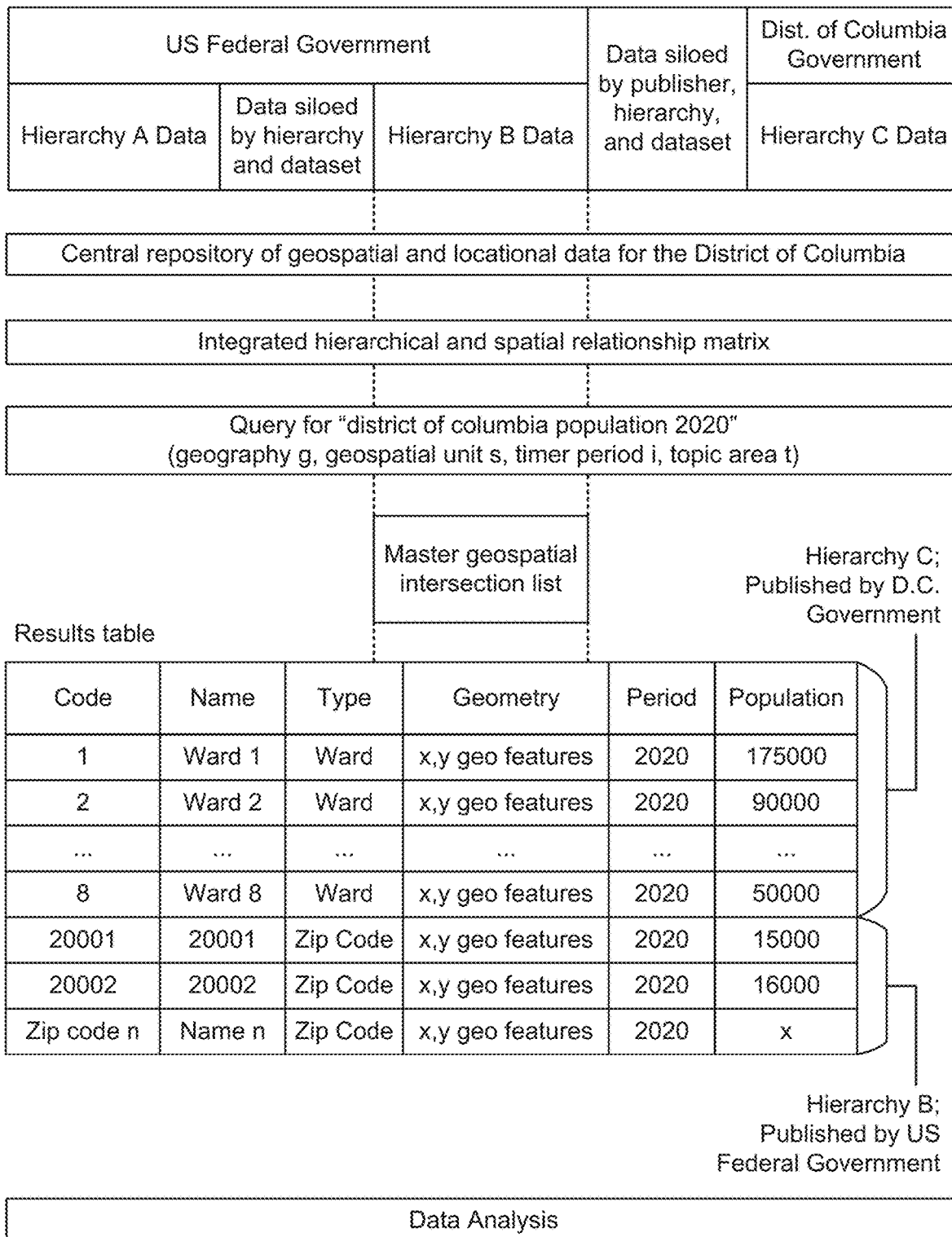
FIGS. 22A and 22B illustrate two examples of the unified processing of all integrated geospatial unit and locational data of a geographical entity across taxonomies based on documented hierarchical and non-hierarchical relationships, according to one or more aspects of the disclosure.
Figure 22B:
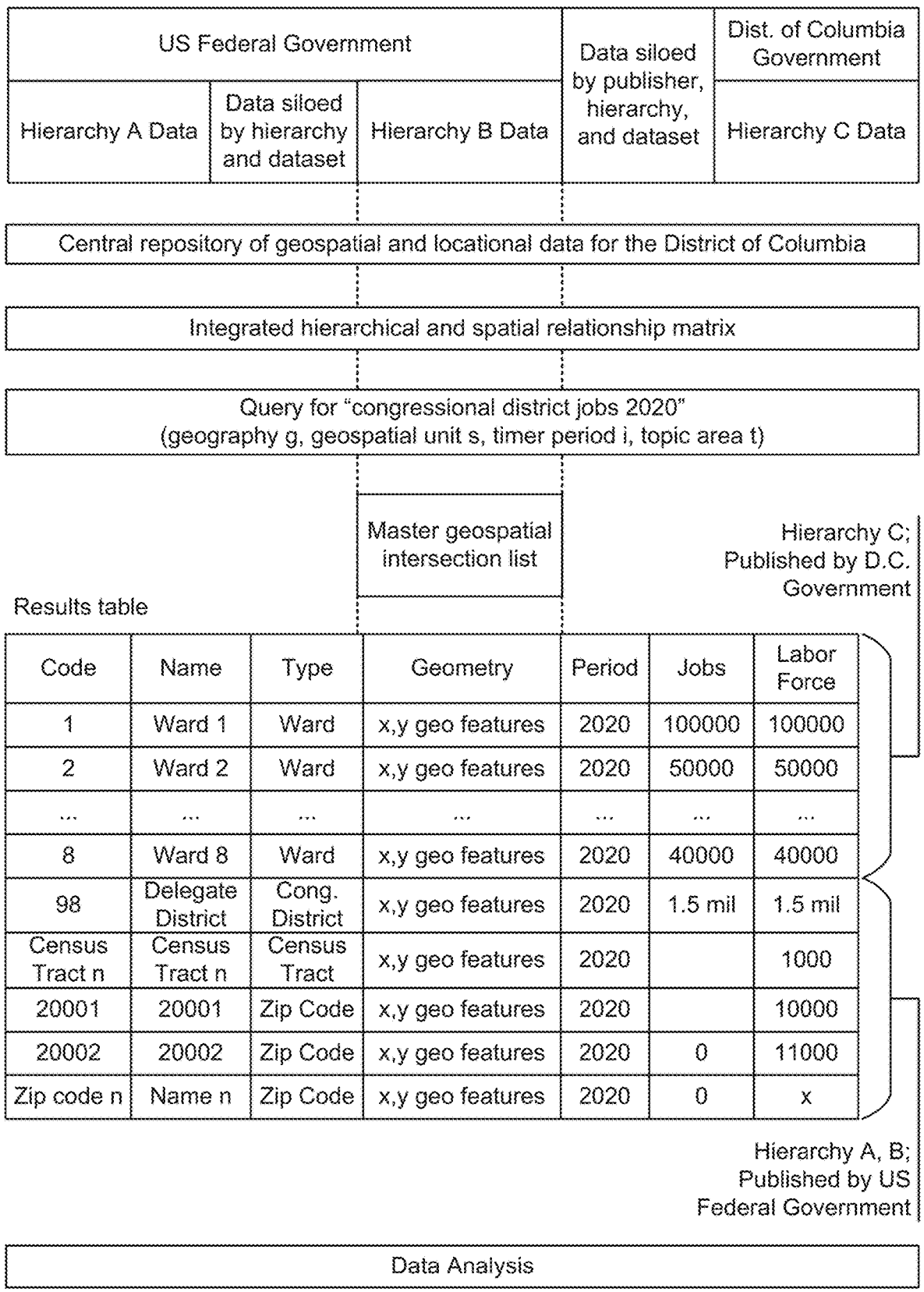

FIGS. 22A and 22B illustrate two examples of the unified processing of all integrated geospatial unit and locational data of a geographical entity across taxonomies based on documented hierarchical and non-hierarchical relationships, according to one or more aspects of the disclosure. In the example of FIG. 22A, a user has entered the query "district of columbia population 2020," which indicates a geography g ("district of columbia"), geospatial unit s ("district of columbia"), time period i ("2020"), and topic area t ("population"). In the example of FIG. 22B, a user has entered the further query "congressional district jobs 2020." In this example, the geography g ("district of columbia") is the same is the previous query. The time period i ("2020") is also the same as the previous query, but the geospatial unit s ("congressional district") and the topic area t ("jobs") is different.

The disclosed system may further provide a visualization system for the aggregation, search, filtering, and display of geospatial and locational data that allows for dynamic rendering of data at any geographical entity and or geospatial unit level. In an aspect, a four-by-four dimensional search and filtering system is provided for the integrated search, filtering, and visualization of unit data (e.g., unit observations or unit-aggregated locational observations) across publisher, hierarchy, and dataset. The system utilizes search and filtering parameters and a four-by-four dimensional interface in which the four identifying features of geospatial and locational data (place, period, topic, unit) are able to be filtered according to the four dimensions of space (length, breadth, height, and time). This creates a matrix interface for the search and filtering of data that also enables dynamic adjustments of search and filtering parameters, including informally linked parameters based on unit relationships, as needed. It also enables all geospatial data for a given spatial entity to be searchable and filterable according to one or multiple geospatial criteria, including place(s), period(s), topic(s), geospatial unit(s), the number of observations or records, the time(s) of the observation or record, and the intensity(ies) of the observation or record. The data can then be visualized and/or exported in new data tables or cartographic visualizations.

FIGS. 23A and 23B illustrate an example of searching and filtering geospatial unit and locational data according to a four-by-four dimensional matrix, according to one or more aspects of the disclosure. As shown in FIGS. 23A and 23B, the four-by-four matrix is organized according to parameters for four identifying features of geospatial and locational data (place, period, topic, unit) and the four dimensions of space (length, breadth, height, and time). As shown in FIG. 23A, for the dimensions of Place and Length, the system filters by the number of locational observations required (N observations). For the dimensions of Period and Time, the system filters by what point in time the locational observation was recorded. For the dimensions of Topic and Height, the system filters and/or orders by the most/least intense observations. For the dimensions of Unit and Breadth, the system includes other geospatial units that meet the same search and filter criteria. FIG. 23B illustrates how the search results are organized according to the four-by-four dimensions of the matrix.

FIG. 24 illustrates an example of four-by-four dimensional searching and filtering of geospatial unit and locational data, according to one or more aspects of the disclosure. As shown in FIG. 24, the search and filtering parameters can be input in any order.

FIGS. 25A and 25B illustrate a specific example of four-by-four dimensional searching and filtering of geospatial unit and locational data, according to one or more aspects of the disclosure. Specifically, FIGS. 25A and 25B illustrate an example where the search term for the "Place" dimension is "District of Columbia," the search term for the Period dimension is "2010-2020," the search term for the Topic dimension is "Jobs," and the search term for the Unit dimension is "Wards."

Figure 26B:
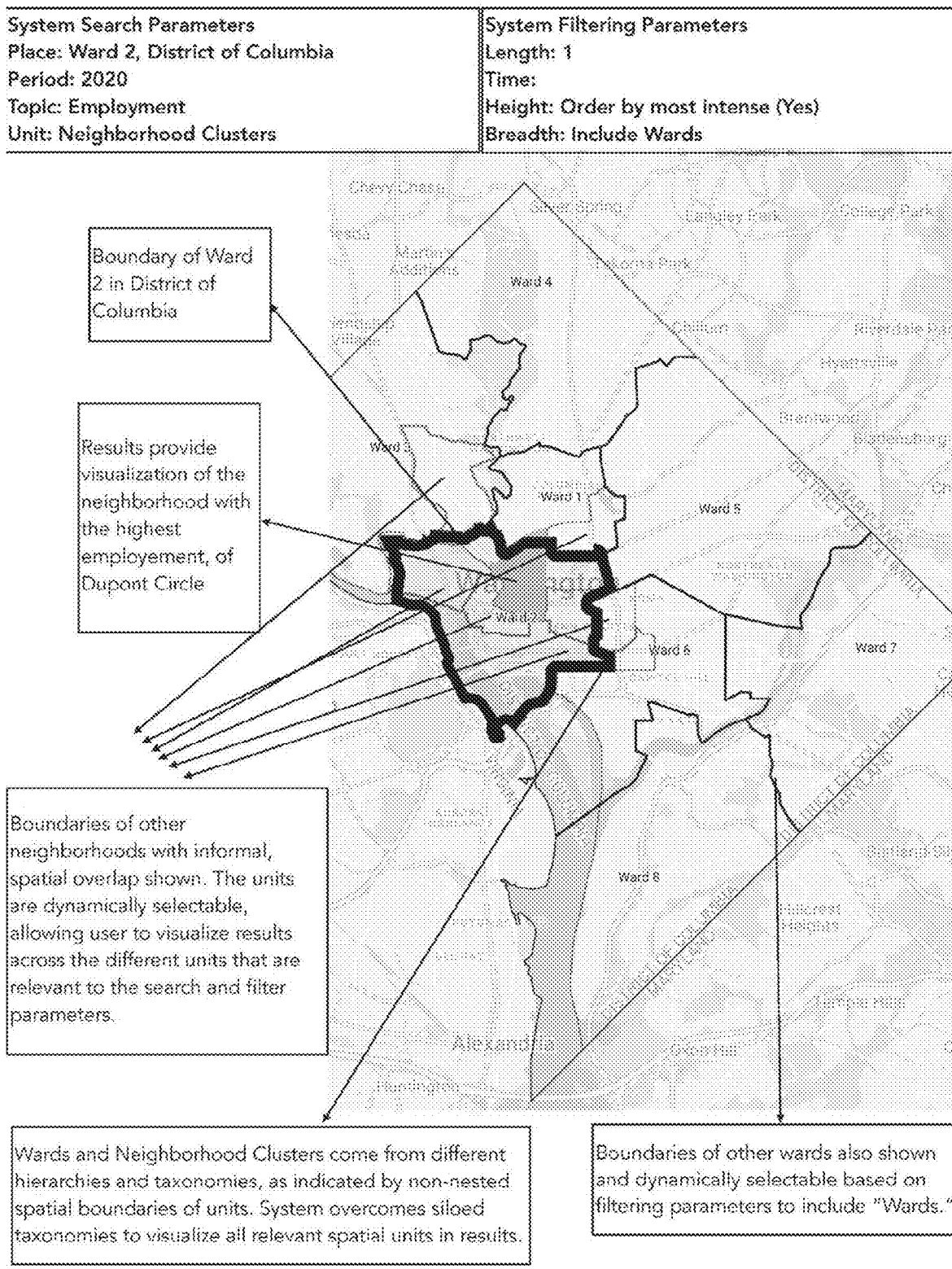

FIGS. 26A and 26B illustrate example results of the example four-by-four dimensional search and filtering of geospatial unit and locational data illustrated in FIGS. 25A and 25B, according to one or more aspects of the disclosure. More specifically, FIG. 26A illustrates example data and visualization outputs in the form of an example output table, and FIG. 26B illustrates example data and visualization outputs in the form of a map (of the District of Columbia) wherein the selected search and filtering parameters reveal the intended search target (Ward 2 in the District of Columbia), those local Neighborhood Clusters which have informal, spatial relationships (since they are from different taxonomies) with Ward 2, and the neighborhood with the highest number of jobs.

The disclosed system further provides a unit-based item search system for the integrated search, browsing, and visualization of non-unit, geo-tagged items (i.e., locational observations) based on geographical aggregation and for the dynamic changing of that aggregation. This allows for item searches to be conducted in specific geographical entities and/or units rather than solely based on item characteristics (e.g., color, price, etc.) and distance characteristics (e.g., delivery to zip code x). For example, a user can search for red t-shirts available at retailers specifically within the neighborhood of Dupont Circle, Washington, D.C., rather than simply searching for a t-shirt that is red and available for shipping to his/her address. Further, the system allows a user to change the geographical aggregation search parameter from, for example, Dupont Circle to Ward 2, thus expanding the spatial size of the search, and then to the Northwest Quadrant and back to Dupont Circle.

Figure 27:
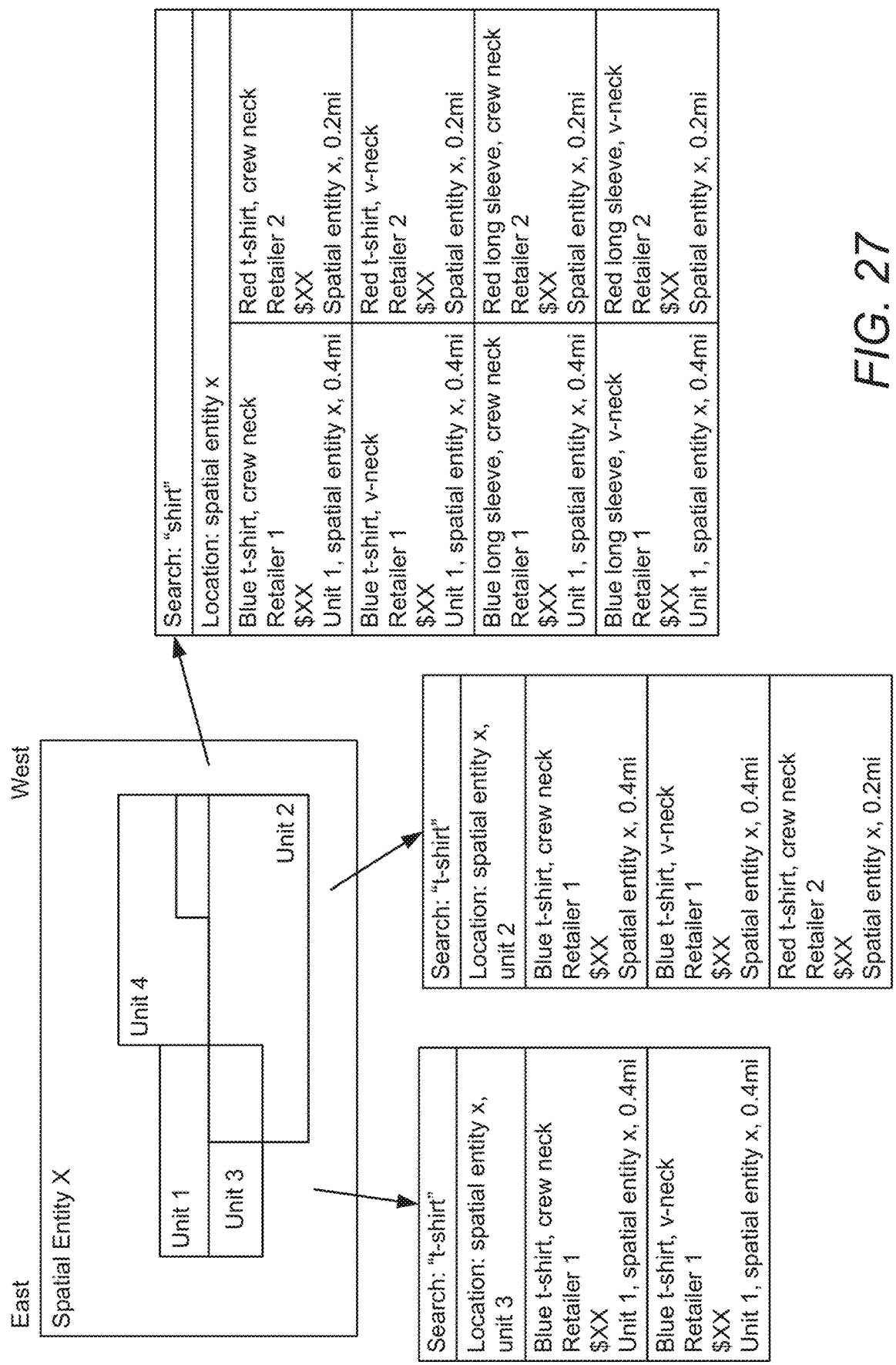
FIG. 27 illustrates an example of integrating, aggregating, and visualizing unit-based, point-based, and geo-tagged locational data at various and dynamically interchangeable geospatial unit aggregation levels, according to one or more aspects of the disclosure.

FIG. 27 illustrates an example of integrating, aggregating, and visualizing unit-based, point-based, and geo-tagged locational data at various and dynamically interchangeable geospatial unit aggregation levels, according to one or more aspects of the disclosure. In the example of FIG. 27, the example search is for "shirt" or "t-shirt" within an example Spatial Entity X (e.g., Dupont Circle, Ward 2, Northwest Quadrant).

Figure 28:
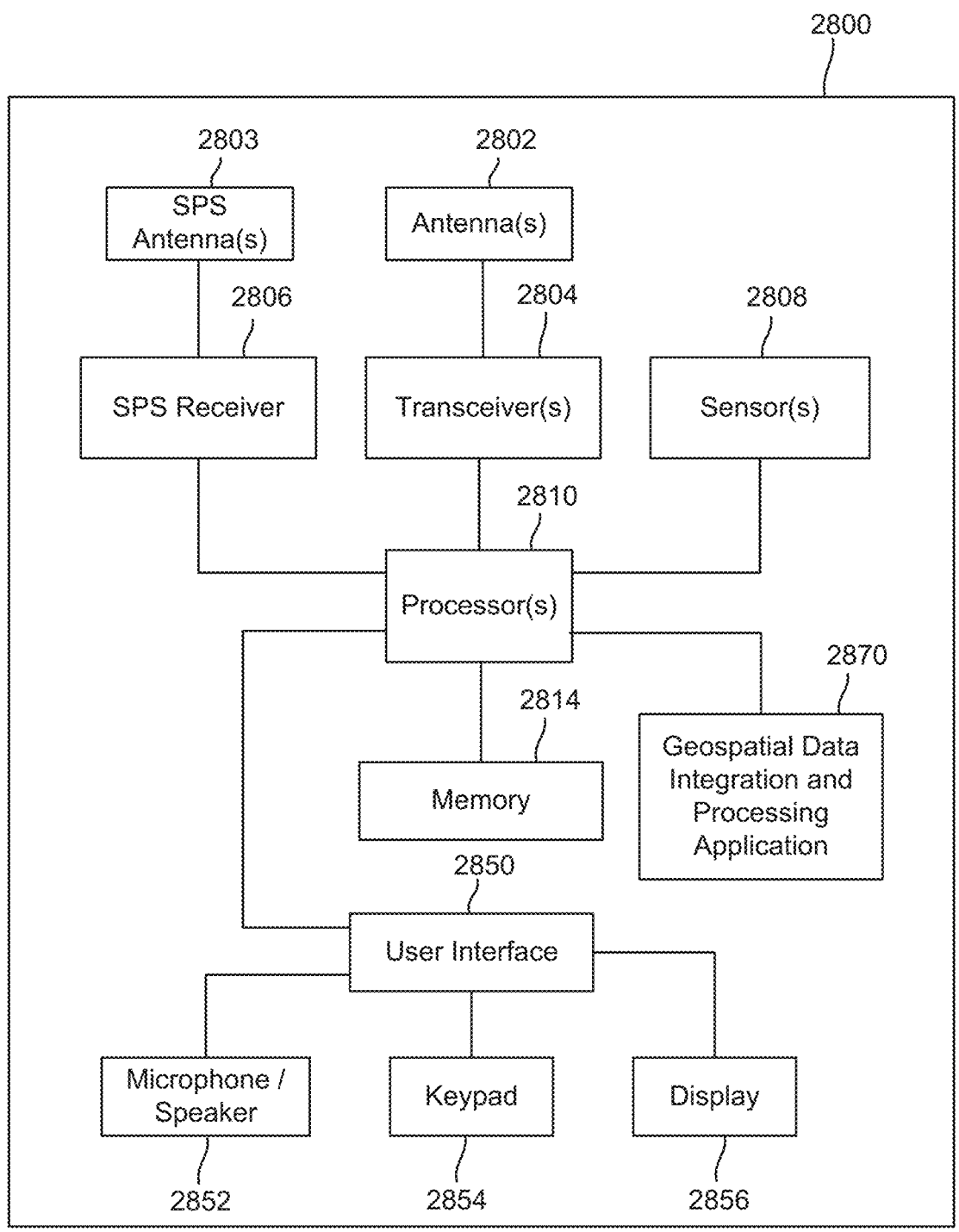
FIG. 28 is a block diagram illustrating various components of an example user device, according to one or more aspects of the disclosure.

FIG. 28 is a block diagram illustrating various components of an example user device 2800, according to aspects of the disclosure. In an aspect, the user device may correspond to any of the user devices described herein, such as the user devices illustrated in FIG. 3. As a specific example, the user device 2800 may be a smartphone, a tablet computer, a laptop computer, a desktop computer, or the like.

For the sake of simplicity, the various features and functions illustrated in the block diagram of FIG. 28 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual user device. Further, it is also recognized that one or more of the features or functions illustrated in the example of FIG. 28 may be further subdivided, or two or more of the features or functions illustrated in FIG. 28 may be combined.

The user device 2800 may include one or more transceivers 2804 connected to one or more antennas 2802 and providing means for communicating (e.g., means for transmitting, means for receiving, means for measuring, means for tuning, means for refraining from transmitting, etc.) with other network nodes, such as other user devices 2800 and/or server(s) 2900 via at least one designated radio access technology (RAT) (e.g., Wi-Fi, Long-Term Evolution (LTE), Fifth Generation New Radio (5G NR), etc.) over one or more wireless communication links. The one or more transceivers 2804 may be variously configured for transmitting and encoding wireless signals (e.g., messages, indications, information, and so on), and, conversely, for receiving and decoding wireless signals (e.g., messages, indications, information, pilots, and so on) in accordance with the designated RAT. In an aspect, the one or more transceivers 2804 and the antenna(s) 2802 may form a (wireless) communication interface of the user device 2800.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 2802), such as an antenna array. Similarly, a receiver may include or be coupled to a plurality of antennas (e.g., antenna(s) 2802), such as an antenna array. In an aspect, the transmitter(s) and receiver(s) may share the same plurality of antennas (e.g., antenna(s) 2802), such that the user device 2800 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The user device 2800 may also include a satellite positioning system (SPS) receiver 2806. The SPS receiver 2806 may be connected to the one or more SPS antennas 2803 and may provide means for receiving and/or measuring satellite signals. The SPS receiver 2806 may comprise any suitable hardware and/or software for receiving and processing SPS signals, such as global positioning system (GPS) signals. The SPS receiver 2806 requests information and operations as appropriate from the other systems, and performs the calculations necessary to determine the UE's 2800 position using measurements obtained by any suitable SPS algorithm.

One or more sensors 2808 may be coupled to one or more processors 2810 and may provide means for sensing or detecting information related to the state and/or environment of the user device 2800, such as speed, heading (e.g., compass heading), headlight status, gas mileage, etc. By way of example, the one or more sensors 2808 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The one or more processors 2810 may include one or more central processing units (CPUs), microprocessors, microcontrollers, ASICs, processing cores, DSPs, field-programmable gate arrays (FPGAs), or the like that provide processing functions, as well as other calculation and control functionality. The one or more processors 2810 may therefore provide means for processing, such as means for determining, means for calculating, means for receiving, means for transmitting, means for indicating, etc. The one or more processors 2810 may include any form of logic suitable for performing, or causing the components of the user device 2800 to perform, at least the techniques described herein.

The one or more processors 2810 may also be coupled to a memory 2814 providing means for storing (including means for retrieving, means for maintaining, etc.) data and software instructions for executing programmed functionality within the user device 2800. The memory 2814 may be on-board the one or more processors 2810 (e.g., within the same integrated circuit (IC) package), and/or the memory 2814 may be external to the one or more processors 2810 and functionally coupled over a data bus.

The user device 2800 may include a user interface 2850 that provides any suitable interface systems, such as a microphone/speaker 2852, keypad 2854, and display 2856 that allow user interaction with the user device 2800. The microphone/speaker 2852 may provide for voice communication services with the user device 2800. The keypad 2854 may comprise any suitable buttons for user input to the user device 2800. The display 2856 may comprise any suitable display, such as, for example, a backlit liquid crystal display (LCD), and may further include a touch screen display for additional user input modes. The user interface 2850 may therefore be a means for providing indications (e.g., audible and/or visual indications) to a user and/or for receiving user input (e.g., via user actuation of a sensing device such a keypad, a touch screen, a microphone, and so on).

In an aspect, the user device 2800 may include a geospatial data integration and processing application 2870 (which may correspond to the integration functionality illustrated in FIG. 3 and described herein) coupled to the one or more processors 2810. The geospatial data integration and processing application 2870 may be a hardware, software, or firmware component that, when executed, causes the user device 2800 to perform the operations described herein. For example, the geospatial data integration and processing application 2870 may be a software module stored in memory 2814 and executable by the one or more processors 2810. As another example, the geospatial data integration and processing application 2870 may be a hardware circuit (e.g., an ASIC, a field-programmable gate array (FPGA), etc.) within the user device 2800.

Figure 29:
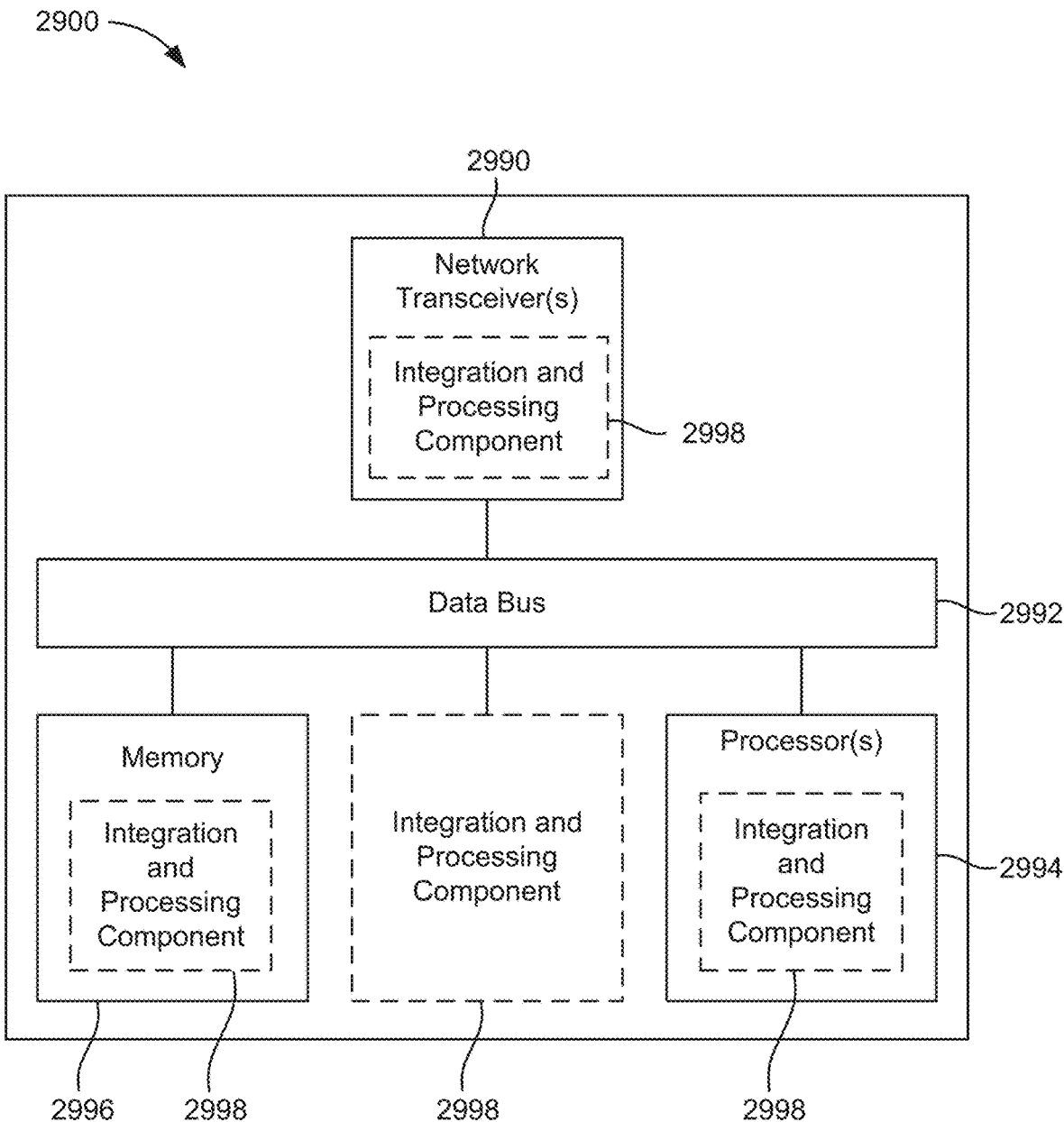
FIG. 29 is a block diagram illustrating various components of an example server, according to one or more aspects of the disclosure.

FIG. 29 illustrates several example components (represented by corresponding blocks) that may be incorporated into a server 2900 (which may correspond to one of the servers described with reference to FIG. 3) to support the operations described herein.

The server 2900 may include one or more network transceivers 2990 providing means for communicating (e.g., means for transmitting, means for receiving, etc.) with other network entities (e.g., other servers 2900). For example, the server 2900 may employ the one or more network transceivers 2990 to communicate with other servers 2900 over one or more wired or wireless network interfaces or with the user device 2800 (e.g., via one or more intermediaries, such as other network components, gateways, access points, etc.).

The server 2900 may also include other components that may be used in conjunction with the operations as disclosed herein. The server 2900 may include one or more processors 2994 for providing functionality relating to, for example, opt-out procedures, as described herein, and for providing other processing functionality. The one or more processors 2994 may therefore provide means for processing, such as means for determining, means for calculating, means for receiving, means for transmitting, means for indicating, etc. In an aspect, the one or more processors 2994 may include, for example, one or more general purpose processors, multi-core processors, central processing units (CPUs), ASICS, digital signal processors (DSPs), field programmable gate arrays (FPGAs), other programmable logic devices or processing circuitry, or various combinations thereof.

The server 2900 may include memory circuitry implementing one or more memories 2996 (e.g., each including a memory device) for maintaining information (e.g., the database of companies 124, the database of data brokers 126, and so on). The one or more memories 2996 may therefore provide means for storing, means for retrieving, means for maintaining, etc. In some cases, the server 2900 may include an integration and processing component 2998. The integration and processing component 2998 may be hardware circuits that are part of or coupled to the one or more processors 2994 that, when executed, cause the server 2900 to perform the functionality described herein. In other aspects, the integration and processing component 2998 may be external to the one or more processors 2994 (e.g., part of a modem processing system, integrated with another processing system, etc.). Alternatively, the integration and processing component 2998 may be a memory module stored in the one or more memories 2996 that, when executed by the one or more processors 2994 (or a modem processing system, another processing system, etc.), cause the server 2900 to perform the functionality described herein. FIG. 29 illustrates possible locations of the integration and processing component 2998, which may be, for example, part of the one or more network transceivers 2990, the one or more memories 2996, the one or more processors 2994, or any combination thereof, or may be a standalone component.

The various components of the server 2900 may be communicatively coupled to each other over a data bus 2992. In an aspect, the data bus 2992 may form, or be part of, a communication interface of the server 2900. For example, where different logical entities are embodied in the same device, the data bus 2992 may provide communication between them.

The components of FIG. 29 may be implemented in various ways. In some implementations, the components of FIG. 29 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 2990 to 2998 may be implemented by processor and memory component(s) of the server 2900 (e.g., by execution of appropriate code and/or by appropriate configuration of processor components). For simplicity, various operations, acts, and/or functions are described herein as being performed "by a server." However, as will be appreciated, such operations, acts, and/or functions may actually be performed by specific components or combinations of components of the server 2900, such as the one or more processors 2994, the one or more network transceivers 2990, the one or more memories 2996, the integration and processing component 2998, etc.

Figure 30:
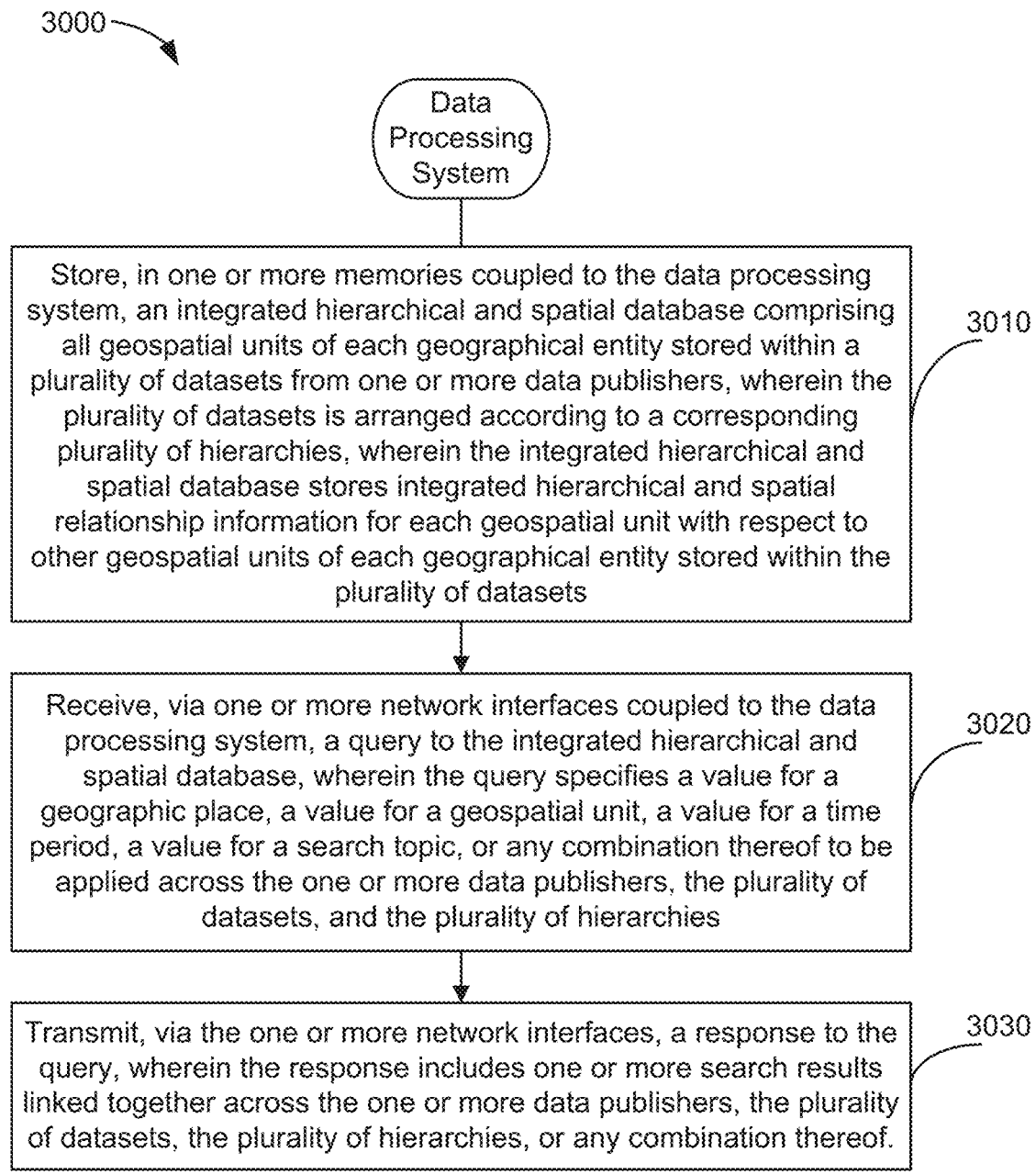
FIG. 30 illustrates an example method of integrating and processing geospatial and locational data from different taxonomies, according to one or more aspects of the disclosure.

FIG. 30 illustrates an example method 3000 of integrating and processing geospatial and locational data from different taxonomies, according to one or more aspects of the disclosure. In an aspect, method 3000 may be performed by a data processing system. The data processing system may be a server (e.g., server 2900) or a user device (e.g., user device 2800). Alternatively, the data processing system may be the processing system of a server (e.g., the one or more processors 2994, the integration and processing component 2998, etc.) or a user device (e.g., the one or more processors 2810, the geospatial data integration and processing application 2870, etc.).

At 3010, the data processing system stores, in one or more memories coupled to the data processing system (e.g., memory 2996, memory 2814, or a remote memory/data store coupled to the data processing system via the one or more network transceivers 2990 or the transceivers 2804), an integrated hierarchical and spatial database comprising all geospatial units of each geographical entity stored within a plurality of datasets from one or more data publishers, wherein the plurality of datasets is arranged according to a corresponding plurality of hierarchies, wherein the integrated hierarchical and spatial database stores integrated hierarchical and spatial relationship information for each geospatial unit with respect to other geospatial units of each geographical entity stored within the plurality of datasets.

In an aspect, where the data processing system is a user device or processing system of the user device, operation 3010 may be performed by the one or more transceivers 2804, the one or more processors 2810, memory 2814, and/or the geospatial data integration and processing application, any or all of which may be considered means for performing this operation. Where the data processing system is a server or a processing system of the server, operation 3010 may be performed by the one or more network transceivers 2990, the one or more processors 2994, memory 2996, and/or the integration and processing component 2998, any or all of which may be considered means for performing this operation.

At 3020, the data processing system receives, via one or more network interfaces (e.g., the one or more network transceivers 2990 or the transceivers 2804) coupled to the data processing system, a query to the integrated hierarchical and spatial database, wherein the query specifies a value for a geographic place, a value for a geospatial unit, a value for a time period, a value for a search topic, or any combination thereof to be applied across the one or more data publishers, the plurality of datasets, and the plurality of hierarchies.

In an aspect, where the data processing system is a user device or processing system of the user device, operation 3020 may be performed by the one or more transceivers 2804, the one or more processors 2810, memory 2814, and/or the geospatial data integration and processing application, any or all of which may be considered means for performing this operation. Where the data processing system is a server or a processing system of the server, operation 3020 may be performed by the one or more network transceivers 2990, the one or more processors 2994, memory 2996, and/or the integration and processing component 2998, any or all of which may be considered means for performing this operation.

At 3030, the data processing system transmits, via the one or more network interfaces, a response to the query, wherein the response includes one or more search results linked together across the one or more data publishers, the plurality of datasets, the plurality of hierarchies, or any combination thereof.

In an aspect, where the data processing system is a user device or processing system of the user device, operation 3030 may be performed by the one or more transceivers 2804, the one or more processors 2810, memory 2814, and/or the geospatial data integration and processing application, any or all of which may be considered means for performing this operation. Where the data processing system is a server or a processing system of the server, operation 3030 may be performed by the one or more network transceivers 2990, the one or more processors 2994, memory 2996, and/or the integration and processing component 2998, any or all of which may be considered means for performing this operation.

In some cases, the method 3000 may further include (not shown) retrieving, via the one or more network interfaces, the plurality of datasets from the one or more data publishers, the plurality of datasets arranged according to the corresponding plurality of hierarchies, and storing, in the one or more memories, a geospatial unit database (e.g., the master geospatial unit list illustrated in FIG. 4) comprising all geospatial units of each geographical entity stored within the plurality of datasets, wherein the geospatial unit database stores geospatial unit identification variables for each geospatial unit. The method 3000 may further include storing, in the one or more memories, a geospatial intersection database (e.g., the master geospatial intersection database illustrated in FIG. 6) comprising all geospatial units of each geographical entity stored within the plurality of datasets, wherein the geospatial intersection database stores spatial features of each geospatial unit indicating spatial relationships of the geospatial unit with respect to other geospatial units of each geographical entity stored within the plurality of datasets. The method 3000 may further include storing, in the one or more memories, a hierarchical relationship linkage database (e.g., the unified spatial aggregation map of hierarchical and non-hierarchical relationships and linkages illustrated in FIG. 10) comprising all geospatial units of each geographical entity stored within the plurality of datasets, wherein the hierarchical relationship linkage database stores hierarchical information for each geospatial unit indicating hierarchical and non-hierarchical spatial relationships of the geospatial unit with respect to other geospatial units of each geographical entity stored within the plurality of datasets.

In some cases, the geospatial unit identification variables for each geospatial unit may include name, type, code, and geometry of the geospatial unit.

In some cases, types of the integrated hierarchical and spatial relationship information for each geospatial unit may include one or more of: hierarchical, spatial, full spatial overlap, partial spatial overlap, or no spatial overlap.

In some cases, the integrated hierarchical and spatial relationship information may include one or more variables indicating that a pair of geospatial units are spatially compatible, as described above with reference to FIGS. 13A and 13B. In this case, the pair of geospatial units may be determined to be spatially compatible based on a determination that the pair of geospatial units is from the same data publisher and that the pair of geospatial units is from a same hierarchy, shares a foundational sub-unit, has a spatial overlap, or any combination thereof. Alternatively, the pair of geospatial units may be determined to be spatially compatible based on a determination that the pair of geospatial units is from different data publishers and that the pair of geospatial units is from a same hierarchy, shares a foundational sub-unit, has a spatial overlap, or any combination thereof.

In some cases, the method 3000 may further include (not shown) storing, in the one or more memories, a geospatial unit-based database of geo-tagged items (e.g., the spatial unit-based repository of geo-tagged items illustrated in FIG. 19B), wherein the geospatial unit-based database of geo-tagged items stores linkages between non-geospatial unit geo-tagged items and respective geospatial units of each geographical entity stored within the plurality of datasets.

In some cases, the geospatial unit-based database of geo-tagged items may include a four-by-four dimensional matrix identifying four dimensions of locational information of a non-geospatial unit geo-tagged item with respect to four dimensions of geographical space. In some cases, the four dimensions of the locational information may include the geographic place, the geospatial unit, the time period, and the search topic, and the four dimensions of geographical space may include length, breadth, height, and time.

In some cases, search results matching the value of the geographic place, the value of the geospatial unit, the value of the time period, the value of the search topic, or the combination thereof may be dynamically filtered based on a value of the length, a value of the breadth, a value of the height, and a value of the time to determine the one or more search results. In some cases, the query may further specify the value of the length, the value of the breadth, the value of the height, and the value of the time.

There are a number of technical advantages to the disclosed system (including the method 3000). For example, as described above, the disclosed system enables the integration of all unique geospatial units from different taxonomies for a given geographical entity to allow for the unified processing, analysis, and visualization of geospatial and locational data for that entity. This is particularly beneficial given the scale of such information processing. For example, a single geographical hierarchy in the U.S. Census Bureau system contains 8.5 million unique geographical entities/units, and there are over a dozen U.S. Census Bureau hierarchies. As another example, the District of Columbia contains over 8,000 unique geospatial units from more than 20 unique hierarchies. As will be appreciated, the number of unique hierarchical and non-hierarchical spatial relationships that would be produced when the relationship mapping is completed is even larger than processing the geospatial units alone. For example, the geospatial units in the District of Columbia have approximately 65.5 million unique relationships among them.

Beyond the number of geospatial units, the fact that geospatial units include two-dimensional spatial information (e.g., centroid location, land area, border locations, etc.) adds significantly more complexity. For example, to manually determine the spatial overlap among geospatial units (as would be required currently) would require a user to layer individual maps of different unit types on top of each other (e.g., census blocks on top of zip codes on top of states, etc.) to determine each unique relationship (both hierarchical and non-hierarchical) for every single unit. However, as will be appreciated, layering units on top of each other obscures other units and blocks the documentation of relationships. Further, maps and spatial units represent actual geography, and as such, the user would have to manually measure the geometry (e.g., centroid location, length of borders etc.) of each unit to create an accurate relationship map.

Further, geospatial units represent three dimensional geographical areas in two-dimensional space, which produces spatial distortion. This is a well-known issue for the creation of maps (e.g., Albert, Polyconic, and Lambert distortions), but it also applies here when attempting to perform accurate spatial relationship mapping. Thus, using conventional techniques to determine spatial overlap, it would be virtually impossible to accurately document spatial relationships between geospatial units because the distortion would introduce systematic noise that would have to be corrected in order to obtain accurate geographical locations.

Further adding to the complexity solved by the disclosed system is the integration of different taxonomies. For example, for any given geographical entity, there may be many publishers of data (e.g., the U.S. Census Bureau, the Government of the District of Columbia, etc.). For any given publisher, there may be multiple hierarchies for different spatial units. Because of this, there is no standardization of naming conventions for geospatial units, and there are different geospatial units of different types that have the same names and or codes. Thus, any manual integration process would have to identify instances where there are duplicate codes for different units of different types and then apply a standardization process that preserves the geometry of the unit(s) while assigning unique identifiers to allow for fully integrated processing.

In contrast, the disclosed system dramatically reduces, and even eliminates, the foregoing complexities, thereby drastically improving the field of geospatial and locational data processing and analysis systems.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A data processing system, comprising:
one or more memories;
one or more network interfaces; and
one or more processors coupled to the one or more memories and the one or more network interfaces, the one or more processors, either alone or in combination, configured to:
store, in the one or more memories, an integrated hierarchical and spatial database comprising all geospatial units of each geographical entity stored within a plurality of datasets from one or more data publishers, wherein the plurality of datasets is arranged according to a corresponding plurality of different hierarchies, wherein the integrated hierarchical and spatial database stores integrated hierarchical and spatial relationship information for each geospatial unit with respect to other geospatial units of each geographical entity stored within the plurality of datasets according to the plurality of different hierarchies, wherein integration of the plurality of different hierarchies within the integrated hierarchical and spatial database indicates relationships between different types of geospatial units across the plurality of different hierarchies;
receive, via the one or more network interfaces, a query to the integrated hierarchical and spatial database, wherein the query specifies a value for a geographic place, a value for a geospatial unit, a value for a time period, a value for a search topic, or any combination thereof to be applied across the one or more data publishers, the plurality of datasets, and the plurality of different hierarchies; and
transmit, via the one or more network interfaces, a response to the query, wherein the response includes one or more search results associated with different geospatial units that are linked together across the one or more data publishers, the plurality of datasets, the plurality of different hierarchies, or any combination thereof based on the relationships between the different types of geospatial units across the plurality of hierarchies stored in the integrated hierarchical and spatial database.

2. The data processing system of claim 1, wherein the one or more processors, either alone or in combination, are further configured to:
retrieve, via the one or more network interfaces, the plurality of datasets from the one or more data publishers, the plurality of datasets arranged according to the corresponding plurality of different hierarchies;
store, in the one or more memories, a geospatial unit database comprising all geospatial units of each geographical entity stored within the plurality of datasets, wherein the geospatial unit database stores geospatial unit identification variables for each geospatial unit;
store, in the one or more memories, a geospatial intersection database comprising all geospatial units of each geographical entity stored within the plurality of datasets, wherein the geospatial intersection database stores spatial features of each geospatial unit indicating spatial relationships of the geospatial unit with respect to other geospatial units of each geographical entity stored within the plurality of datasets; and
store, in the one or more memories, a hierarchical relationship linkage database comprising all geospatial units of each geographical entity stored within the plurality of datasets, wherein the hierarchical relationship linkage database stores hierarchical information for each geospatial unit indicating hierarchical and non-hierarchical spatial relationships of the geospatial unit with respect to other geospatial units of each geographical entity stored within the plurality of datasets.

3. The data processing system of claim 2, wherein the geospatial unit identification variables for each geospatial unit comprise name, type, code, and geometry of the geospatial unit.

4. The data processing system of claim 1, wherein types of the integrated hierarchical and spatial relationship information for each geospatial unit comprise one or more of:
hierarchical,
spatial,
full spatial overlap,
partial spatial overlap, or
no spatial overlap.

5. The data processing system of claim 1, wherein:
the integrated hierarchical and spatial relationship information comprises one or more variables indicating that a pair of geospatial units are spatially compatible.

6. The data processing system of claim 5, wherein:
the pair of geospatial units are determined to be spatially compatible based on a determination that the pair of geospatial units is from the same data publisher and that the pair of geospatial units is from a same hierarchy, shares a foundational sub-unit, has a spatial overlap, or any combination thereof; or
the pair of geospatial units are determined to be spatially compatible based on a determination that the pair of geospatial units is from different data publishers and that the pair of geospatial units is from a same hierarchy, shares a foundational sub-unit, has a spatial overlap, or any combination thereof.

7. The data processing system of claim 1, wherein the one or more processors, either alone or in combination, are further configured to:
store, in the one or more memories, a geospatial unit-based database of geo-tagged items, wherein the geospatial unit-based database of geo-tagged items stores linkages between non-geospatial unit geo-tagged items and respective geospatial units of each geographical entity stored within the plurality of datasets.

8. The data processing system of claim 7, wherein the geospatial unit-based database of geo-tagged items comprises a four-by-four dimensional matrix identifying four dimensions of locational information of a non-geospatial unit geo-tagged item with respect to four dimensions of geographical space.

9. The data processing system of claim 8, wherein:
the four dimensions of the locational information comprise the geographic place, the geospatial unit, the time period, and the search topic, and
the four dimensions of geographical space comprise length, breadth, height, and time.

10. The data processing system of claim 9, wherein search results matching the value of the geographic place, the value of the geospatial unit, the value of the time period, the value of the search topic, or the combination thereof are dynamically filtered based on a value of the length, a value of the breadth, a value of the height, and a value of the time to determine the one or more search results.

11. The data processing system of claim 10, wherein the query further specifies the value of the length, the value of the breadth, the value of the height, and the value of the time.

12. A method performed by a data processing system, comprising:
storing, in one or more memories coupled to the data processing system, an integrated hierarchical and spatial database comprising all geospatial units of each geographical entity stored within a plurality of datasets from one or more data publishers, wherein the plurality of datasets is arranged according to a corresponding plurality of different hierarchies, wherein the integrated hierarchical and spatial database stores integrated hierarchical and spatial relationship information for each geospatial unit with respect to other geospatial units of each geographical entity stored within the plurality of datasets according to the plurality of different hierarchies, wherein integration of the plurality of different hierarchies within the integrated hierarchical and spatial database indicates relationships between different types of geospatial units across the plurality of different hierarchies;
receiving, via one or more network interfaces coupled to the data processing system, a query to the integrated hierarchical and spatial database, wherein the query specifies a value for a geographic place, a value for a geospatial unit, a value for a time period, a value for a search topic, or any combination thereof to be applied across the one or more data publishers, the plurality of datasets, and the plurality of different hierarchies; and
transmitting, via the one or more network interfaces, a response to the query, wherein the response includes one or more search results associated with different geospatial units that are linked together across the one or more data publishers, the plurality of datasets, the plurality of different hierarchies, or any combination thereof based on the relationships between the different types of geospatial units across the plurality of hierarchies stored in the integrated hierarchical and spatial database.

13. The method of claim 12, further comprising:
retrieving, via the one or more network interfaces, the plurality of datasets from the one or more data publishers, the plurality of datasets arranged according to the corresponding plurality of different hierarchies;
storing, in the one or more memories, a geospatial unit database comprising all geospatial units of each geographical entity stored within the plurality of datasets, wherein the geospatial unit database stores geospatial unit identification variables for each geospatial unit;
storing, in the one or more memories, a geospatial intersection database comprising all geospatial units of each geographical entity stored within the plurality of datasets, wherein the geospatial intersection database stores spatial features of each geospatial unit indicating spatial relationships of the geospatial unit with respect to other geospatial units of each geographical entity stored within the plurality of datasets; and
storing, in the one or more memories, a hierarchical relationship linkage database comprising all geospatial units of each geographical entity stored within the plurality of datasets, wherein the hierarchical relationship linkage database stores hierarchical information for each geospatial unit indicating hierarchical and non-hierarchical spatial relationships of the geospatial unit with respect to other geospatial units of each geographical entity stored within the plurality of datasets.

14. The method of claim 13, wherein the geospatial unit identification variables for each geospatial unit comprise name, type, code, and geometry of the geospatial unit.

15. The method of claim 12, wherein types of the integrated hierarchical and spatial relationship information for each geospatial unit comprise one or more of:
hierarchical,
spatial,
full spatial overlap,
partial spatial overlap, or
no spatial overlap.

16. The method of claim 12, wherein the integrated hierarchical and spatial relationship information comprises one or more variables indicating that a pair of geospatial units are spatially compatible.

17. The method of claim 16, wherein:
the pair of geospatial units are determined to be spatially compatible based on a determination that the pair of geospatial units is from the same data publisher and that the pair of geospatial units is from a same hierarchy, shares a foundational sub-unit, has a spatial overlap, or any combination thereof; or
the pair of geospatial units are determined to be spatially compatible based on a determination that the pair of geospatial units is from different data publishers and that the pair of geospatial units is from a same hierarchy, shares a foundational sub-unit, has a spatial overlap, or any combination thereof.

18. The method of claim 12, further comprising:
storing, in the one or more memories, a geospatial unit-based database of geo-tagged items, wherein the geospatial unit-based database of geo-tagged items stores linkages between non-geospatial unit geo-tagged items and respective geospatial units of each geographical entity stored within the plurality of datasets.

19. The method of claim 18, wherein the geospatial unit-based database of geo-tagged items comprises a four-by-four dimensional matrix identifying four dimensions of locational information of a non-geospatial unit geo-tagged item with respect to four dimensions of geographical space.

20. An apparatus, comprising:
means for storing an integrated hierarchical and spatial database comprising all geospatial units of each geographical entity stored within a plurality of datasets from one or more data publishers, wherein the plurality of datasets is arranged according to a corresponding plurality of different hierarchies, wherein the integrated hierarchical and spatial database stores integrated hierarchical and spatial relationship information for each geospatial unit with respect to other geospatial units of each geographical entity stored within the plurality of datasets according to the plurality of different hierarchies, wherein integration of the plurality of different hierarchies within the integrated hierarchical and spatial database indicates relationships between different types of geospatial units across the plurality of different hierarchies;
means for receiving a query to the integrated hierarchical and spatial database, wherein the query specifies a value for a geographic place, a value for a geospatial unit, a value for a time period, a value for a search topic, or any combination thereof to be applied across the one or more data publishers, the plurality of datasets, and the plurality of different hierarchies; and means for transmitting a response to the query, wherein the response includes one or more search results associated with different geospatial units that are linked together across the one or more data publishers, the plurality of datasets, the plurality of different hierarchies, or any combination thereof based on the relationships between the different types of geospatial units across the plurality of hierarchies stored in the integrated hierarchical and spatial database.

* * * * *